US008947568B2

(12) United States Patent
Egawa

(10) Patent No.: US 8,947,568 B2
(45) Date of Patent: Feb. 3, 2015

(54) SOLID-STATE IMAGING DEVICE

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 302 days.

(21) Appl. No.: 12/874,745

(22) Filed: Sep. 2, 2010

(65) Prior Publication Data

US 2011/0058080 A1    Mar. 10, 2011

(30) Foreign Application Priority Data

Sep. 7, 2009   (JP) ................................. 2009-206234

(51) Int. Cl.
| | |
|---|---|
| H04N 5/335 | (2011.01) |
| H04N 3/14 | (2006.01) |
| H04N 5/357 | (2011.01) |
| H04N 5/353 | (2011.01) |
| H04N 5/3745 | (2011.01) |

(52) U.S. Cl.
CPC ........... *H04N 5/3572* (2013.01); *H04N 5/3535* (2013.01); *H04N 5/3745* (2013.01)
USPC .......................................... 348/296; 348/304

(58) Field of Classification Search
USPC ........................................................ 348/304
See application file for complete search history.

(56) References Cited

U.S. PATENT DOCUMENTS

| | | | | |
|---|---|---|---|---|
| 6,856,349 | B1* | 2/2005 | Trevino .......................... | 348/302 |
| 7,756,411 | B2* | 7/2010 | Tanaka et al. ................. | 396/155 |
| 8,199,233 | B2* | 6/2012 | Shoyama ....................... | 348/296 |
| 2005/0007460 | A1* | 1/2005 | Stavely et al. ............. | 348/222.1 |
| 2009/0153710 | A1* | 6/2009 | John ............................. | 348/296 |

FOREIGN PATENT DOCUMENTS

| | | |
|---|---|---|
| JP | 2006-115191 | 4/2006 |
| JP | 2006-270292 | 10/2006 |
| JP | 2007-215062 | 8/2007 |

OTHER PUBLICATIONS

Office Action issued Dec. 6, 2011, in Japanese Patent Application No. 2009-206234 with English translation.

* cited by examiner

*Primary Examiner* — Albert Cutler
(74) *Attorney, Agent, or Firm* — Oblon, Spivak, McClelland, Maier & Neustadt, L.L.P.

(57) ABSTRACT

According to one embodiment, a solid-state imaging device includes an imaging area, a vertical line drive circuit, and a control circuit. The imaging area is provided with a plurality of unit pixels arrayed like a two-dimensional matrix. Each unit pixel includes a photoelectric conversion element, a read transistor, an amplifier transistor, and a reset transistor. The vertical line drive circuit is configured to select and drive the unit pixels at a unit of row, and to set a signal storage time of the photoelectric conversion element of each driven unit pixel. The control circuit connected to the vertical line drive circuit, is configured to execute a variable control of the signal storage time at a unit of row of the unit pixel.

10 Claims, 33 Drawing Sheets

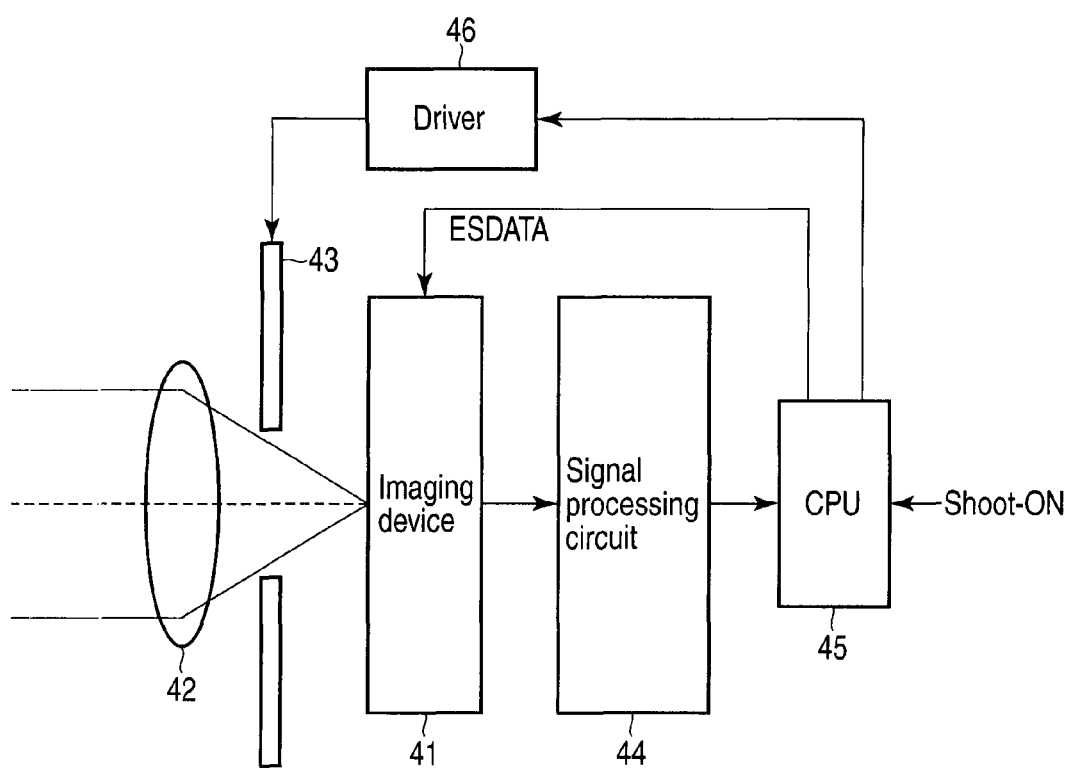
F I G. 7

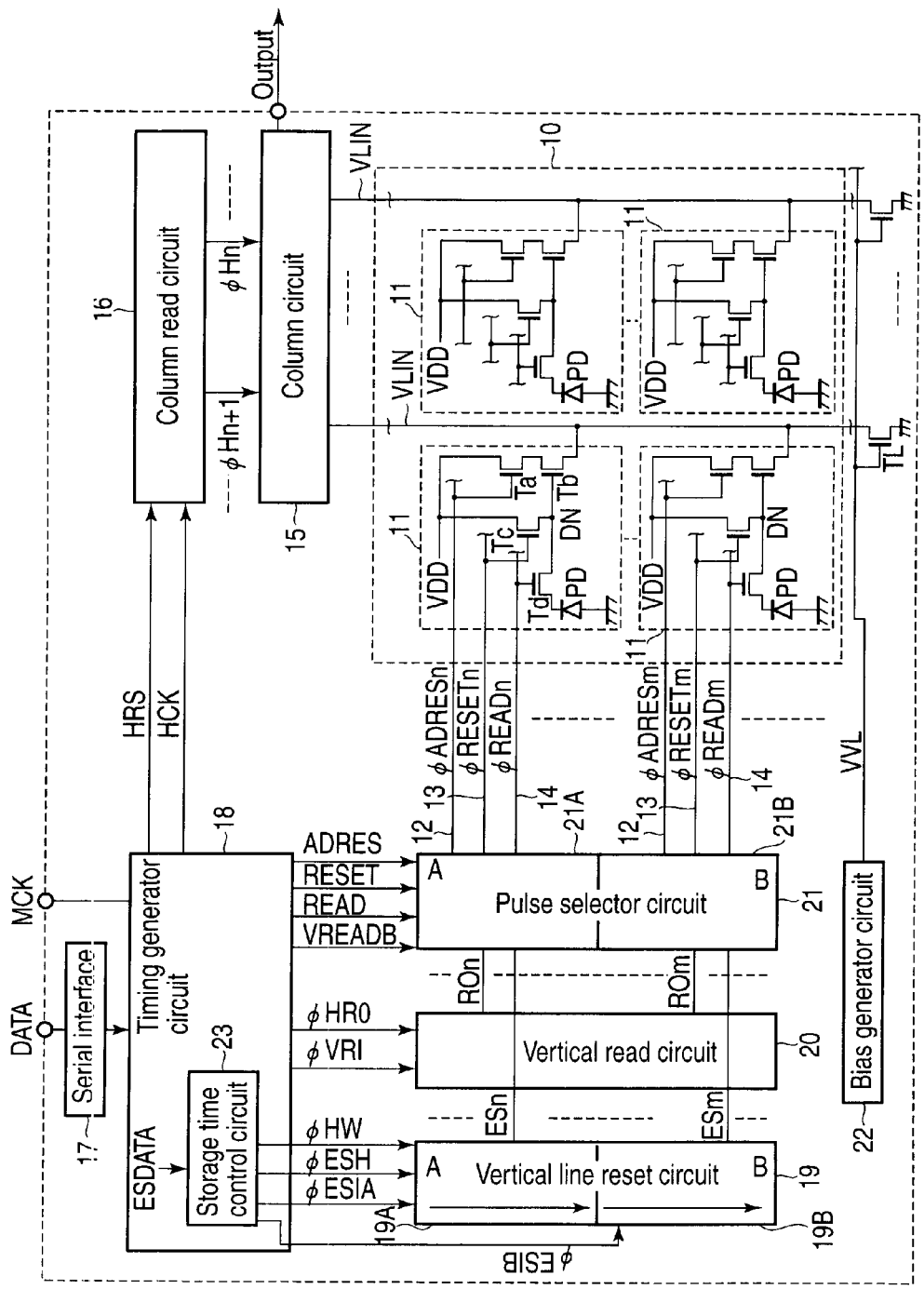
F I G. 10

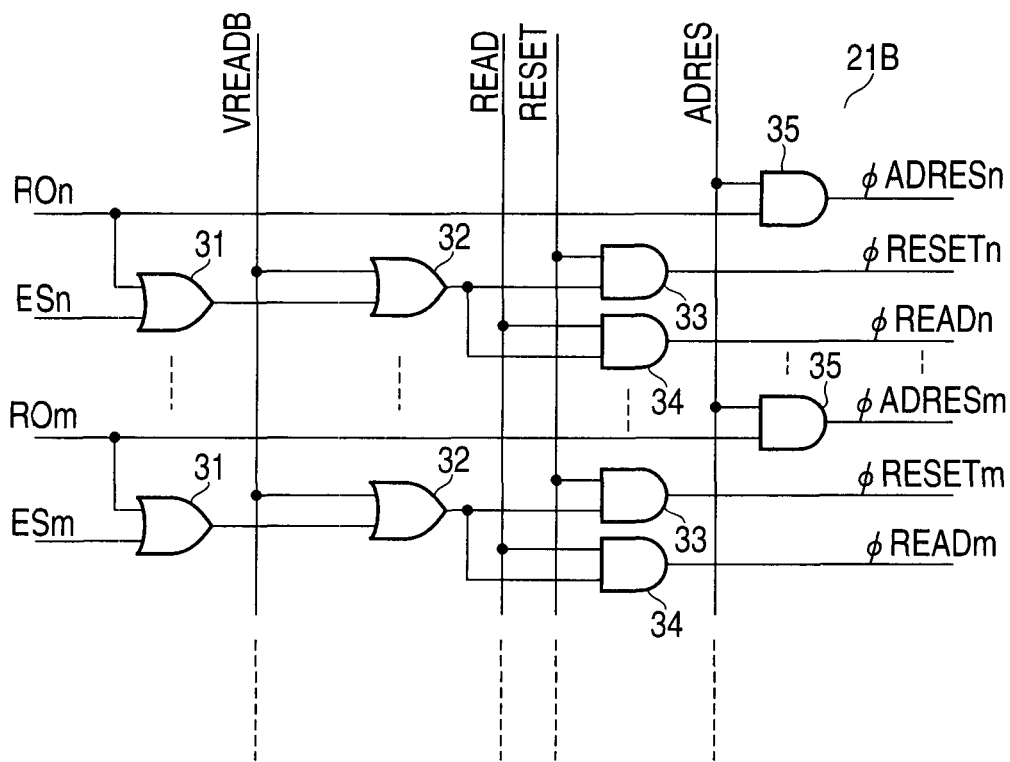
F I G. 13

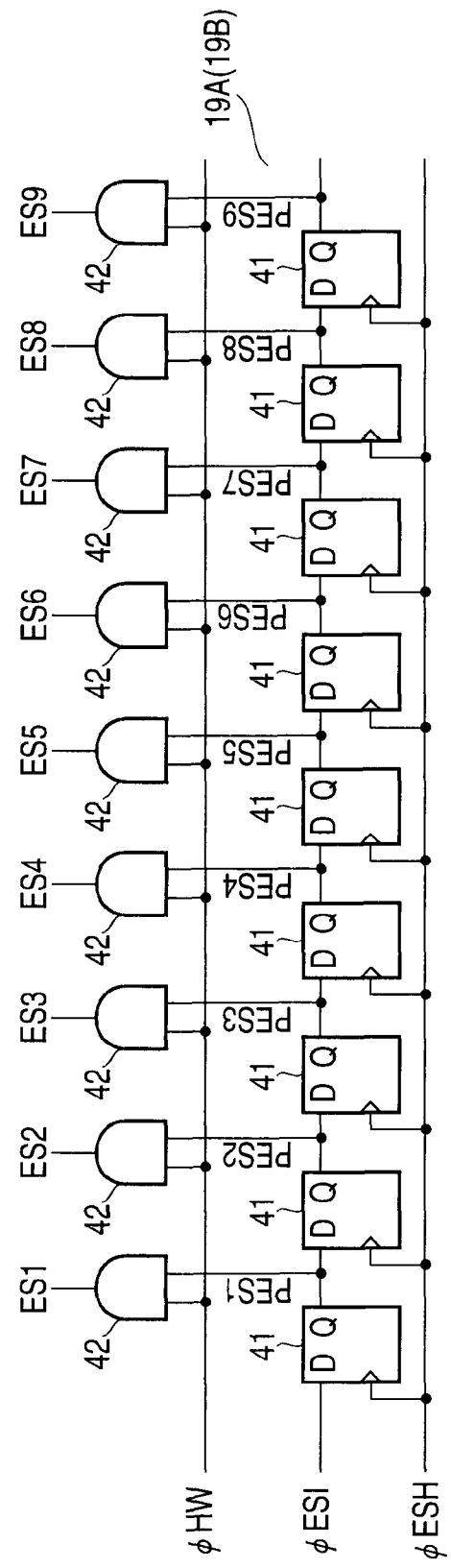
F I G. 20

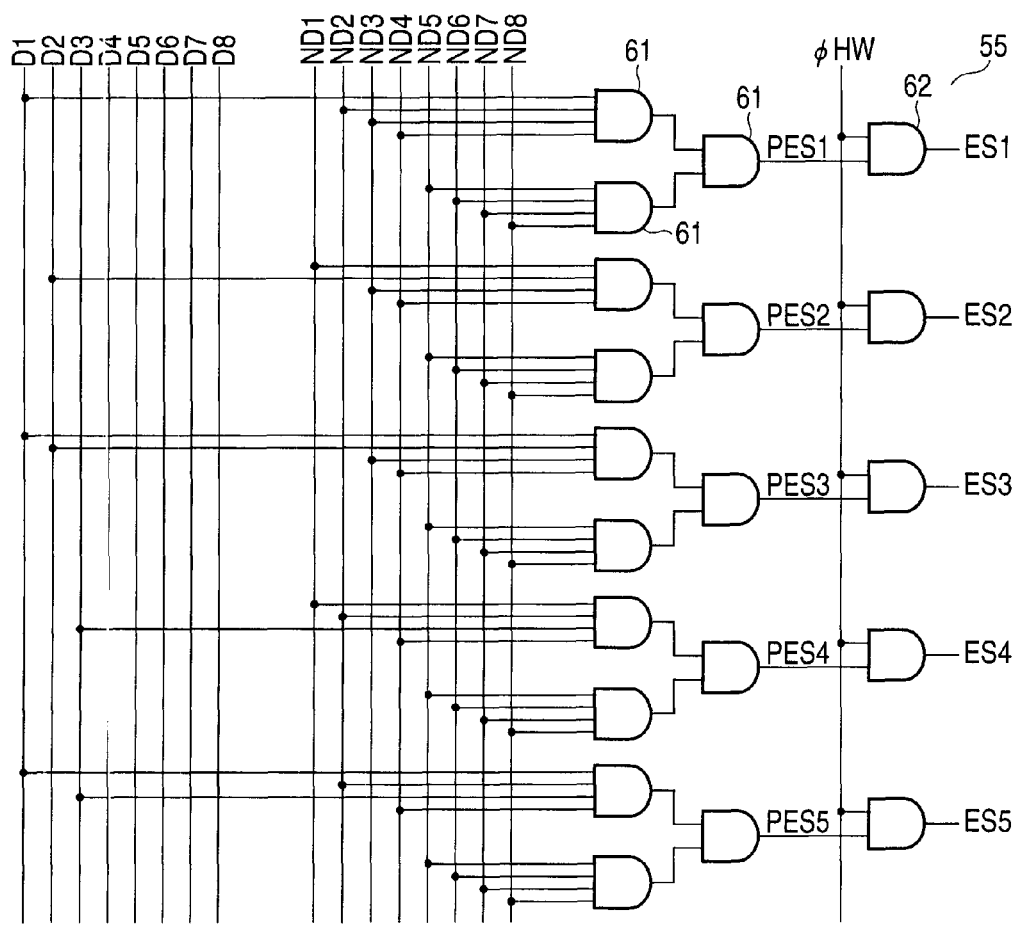
F I G. 26

SOLID-STATE IMAGING DEVICE

CROSS-REFERENCE TO RELATED APPLICATIONS

This application is based upon and claims the benefit of priority from Japanese Patent Application No. 2009-206234, filed Sep. 7, 2009; the entire contents of which are incorporated herein by reference.

FIELD

Embodiments described herein relate generally to a solid-state imaging device such as a CMOS image sensor.

BACKGROUND

In a solid-state imaging device such as a CMOS image sensor, a problem of an SNR (i.e., S/N ratio) reduction arises due to a reduction of the amount of peripheral lights resulting from an optical lens. In a conventional imaging device, scanning for reset and scanning for read are varied in a frame in accordance with the quantity of flicker lights, and control is carried out so that a storage charge of each pixel becomes constant. In this way, a subject image having no reduction of image quality is obtained without depending on an electronic shutter speed under illumination having a flicker component such as a fluorescent lamp.

BRIEF DESCRIPTION OF THE DRAWINGS

FIG. 7 is a block diagram showing one example of the configuration of a digital camera including a mechanical shutter;

FIG. 10 is a block diagram showing the configuration of a CMOS image sensor according to a second embodiment;

FIG. 13 is a circuit diagram showing the detailed configuration of the other block of a pulse selector circuit comprising two blocks shown in FIG. 10;

FIG. 20 is a circuit diagram showing one example of the detailed configuration of one and the other blocks of a vertical line reset circuit comprising two blocks in CMOS image sensors according to the first and second embodiments;

FIG. 26 is a circuit diagram showing the detailed configuration of a decoder circuit shown in FIG. 25;

DETAILED DESCRIPTION

In general, according to one embodiment, a solid-state imaging device includes an imaging area, a vertical line drive circuit, and a control circuit. The imaging area is provided with a plurality of unit pixels arrayed like a two-dimensional matrix. Each unit pixel includes a photoelectric conversion element, a read transistor, an amplifier transistor, and a reset transistor. The vertical line drive circuit is configured to select and drive the unit pixels at a unit of row, and to set a signal storage time of the photoelectric conversion element of each driven unit pixel. The control circuit connected to the vertical line drive circuit, is configured to execute a variable control of the signal storage time at a unit of row of the unit pixel.

Figure 1:
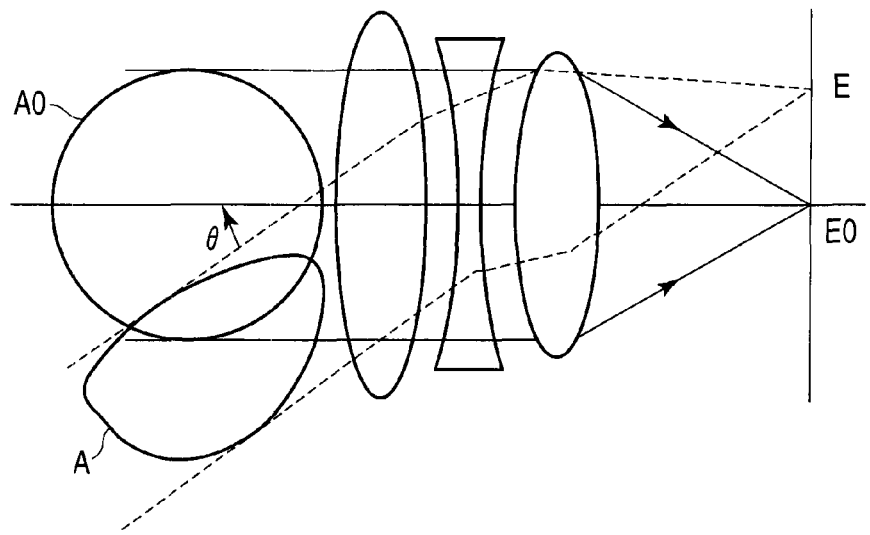
FIG. 1 is a characteristic view to explain the difference in a shape of an entrance pupil between lights, which are incident on an optical axis of an optical lens and out of the same thereof.

FIG. 1 is a characteristic view to explain the difference in a shape of an entrance pupil between lights which are incident on an optical axis of an optical lens and out of the same thereof. As shown in FIG. 1, in an optical lens, lights incident from a position departing from the optical axis becomes an elliptic shape because a part of peripheral lights is distorted due to the limitation of lens aperture and thickness. The phenomenon is called as vignetting. A surface illuminance E outside the optical axis is obtained from the following equation (1)

$$E = E0 \times (A/A0) \times \cos^4 \theta \quad (1)$$

where, E0 is a surface illuminance on the optical axis, A0 is an area of an incident pupil on the optical axis, A is an area of an incident pupil outside the optical axis, and θ is an angle shifted from the optical axis. Further, A/A0 is called as an aperture efficiency.

Figure 2:
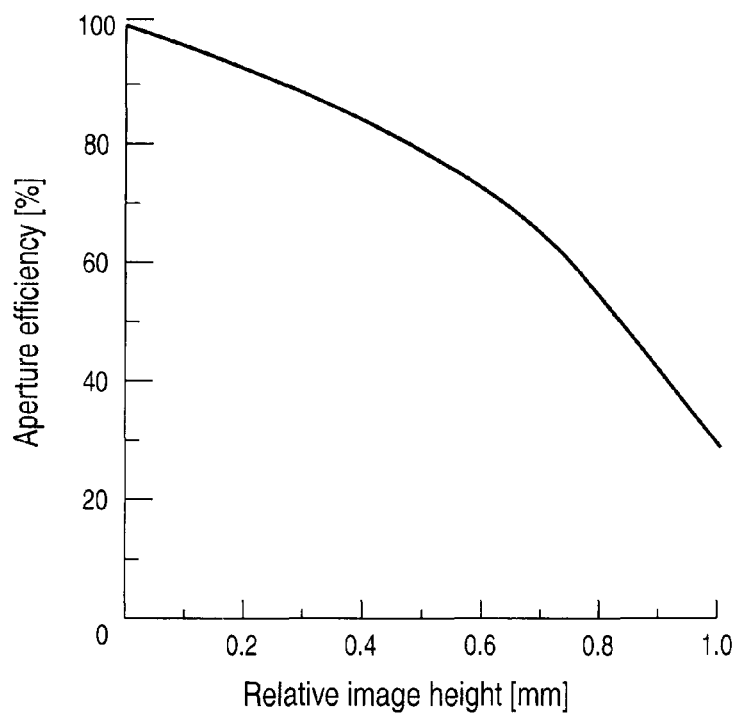
FIG. 2 is a characteristic graph showing a reduction of peripheral lights of an optical lens.

FIG. 2 is a characteristic graph showing one example of a reduction of peripheral lights of an optical lens. In FIG. 2, the horizontal axis takes a relative image height (mm), and the vertical axis takes an aperture efficiency (%). In the peripheral portion of the optical lens, the quantity of light is reduced to about ⅓. An optical shot noise is calculated using the square root of the quantity of light; thus, a SNR is reduced about 5 dB in the peripheral portion. In particular, a handling signal charge is limited in a micro-fine pixel; for this reason, a reduction of image quality further remarkably appears.

Various embodiments will be hereinafter described with reference to the accompanying drawings. In the following description, the same reference numerals are used to designate the corresponding portions, and the overlapping explanation is omitted.

According to one embodiment, a solid-state imaging device includes an imaging area, a vertical line drive circuit and a control circuit. The imaging area is formed with a plurality of unit pixels arrayed like a two-dimensional matrix. Each unit pixel includes a photoelectric conversion element, a read transistor, an amplifier transistor and a reset transistor. Specifically, the photoelectric conversion element photo-electrically converts an incident light to store a signal charge. The read transistor reads a signal charge stored in the photo-electric conversion element to a detection unit. The amplifier transistor amplifies the signal detected by the detection unit, and then, output it. The reset transistor resets the detection unit. The vertical line drive circuit drives a plurality of unit pixels at a unit of row, and sets a signal storage time of the driven photoelectric conversion element of the unit pixel. The control circuit is connected to the vertical line drive circuit, and executes a variable control of the signal storage time at a unit of row.

First Embodiment

Figure 3:
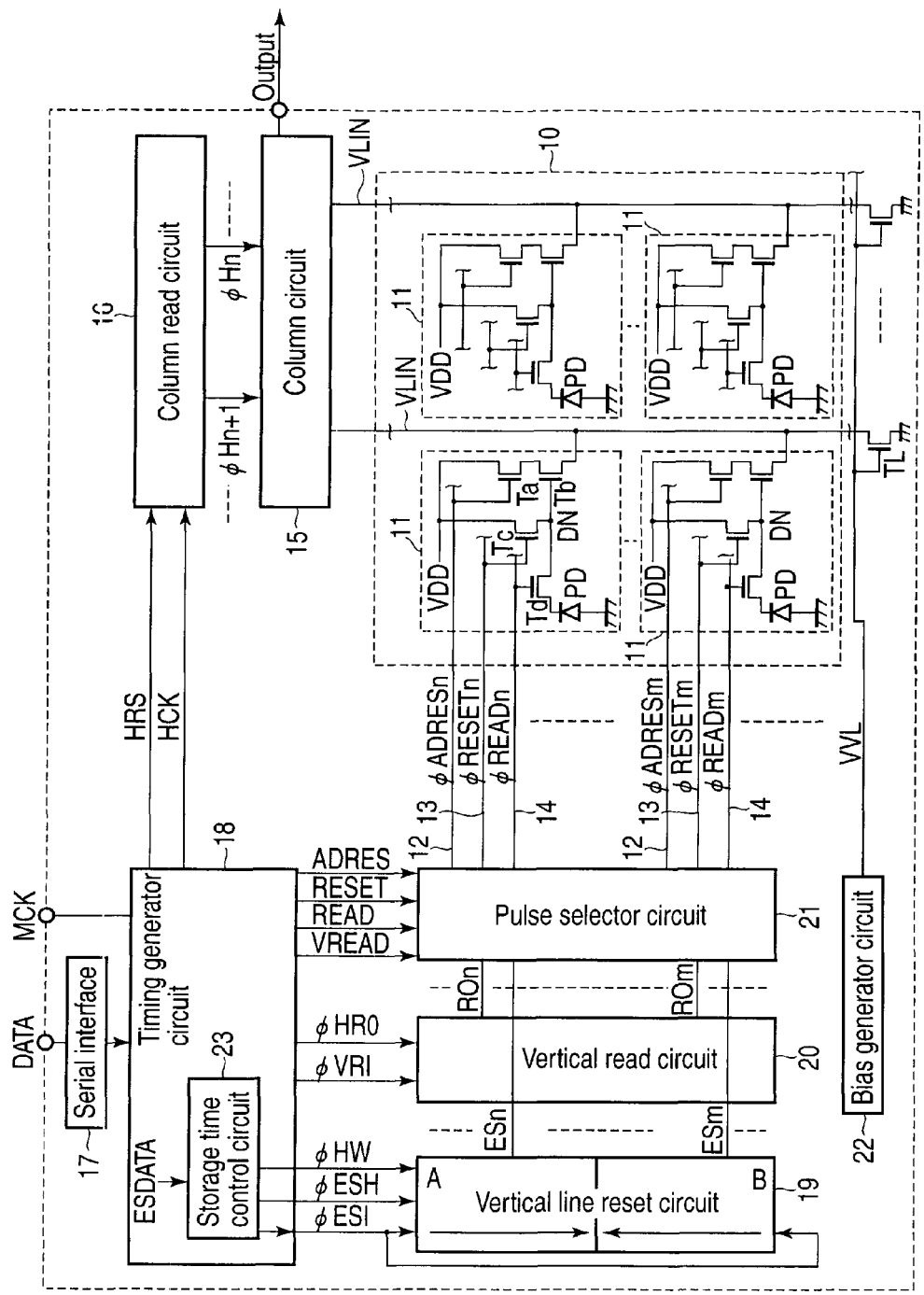
FIG. 3 is a block diagram showing the configuration of a CMOS image sensor according to a first embodiment.

FIG. 3 is a block diagram showing the configuration of a CMOS image sensor according to a first embodiment. In FIG. 3, an imaging area (i.e., pixel area) 10 is formed with a plurality of unit pixels 11, which are arrayed like a two-dimensional matrix. For example, each unit pixel 11 includes four transistors Ta, Tb, Tc, Td and one photodiode PD. In other words, each unit pixel 11 includes a photodiode PD, a read transistor (generally called as shutter gate transistor) Td, an amplifier transistor Tb, a vertical select transistor (generally called as row select transistor) Ta and a reset transistor Tc. Specifically, the photodiode PD has an anode supplied with a ground potential. The read transistor Td has one terminal of a current path between source and drain, which is connected to a cathode of the photodiode PD. The amplifier transistor Tb has a gate electrode, which is connected to the other terminal of a current path between source and drain of read transistor Td. The vertical select transistor Ta has one terminal of a current path between source and drain, which is connected to one terminal of a current path between source and drain of amplifier transistor Tb. The reset transistor Tc has one terminal of a current path between source and drain, which is connected to the gate of amplifier transistor Tb. The other terminal of the current path between source and drain of read transistor Td is connected with a detection node DN. This detection node DN comprises a floating diffusion, which detects a stored signal charge photo-electrically converted by the photodiode PD.

In the imaging area 10, the following lines are connected with respect to each unit pixel 11. Specifically, a plurality of row select lines 12 are connected in common to the gate electrode of each vertical select transistor Ta included in a plurality of unit pixels 11. A plurality of reset lines 13 are connected in common to the gate electrode of each reset transistor Tc included in a plurality of unit pixels 11 of the same row. A plurality of read lines 14 are connected in common to the gate electrode of each read transistor Td included in a plurality of unit pixels 11 of the same row.

In the imaging area 10, the following lines are further connected with respect to each unit pixel 11. Namely, a plurality of vertical signal lines VLIN are connected in common to the other terminal of the current path of each amplifier transistor Tb included in a plurality of unit pixels 11 of the same column (i.e., the same horizontal line).

One terminal portion of the imaging area 10 in the row direction is provided with a plurality of load transistors TL. Each load transistor TL has one terminal of a current path between source and drain, which is connected to the corresponding vertical signal line VLIN, and has the other terminal of the current path, which is supplied with a ground potential.

The other terminal portion of the imaging area 10 in the row direction is provided with a column circuit 15 and a column read circuit 16. The column circuit 15 is connected with a plurality of vertical signal lines VLIN. The column circuit 15 receives analog pixel signals read to a plurality of vertical signal lines VLIN. Then, the circuit 15 executes a noise cancel processing by a correlated double sampling (CDS) operation and an analog-to-digital conversion with respect to the received pixel signals to generate and latch a digitized pixel signal. The column read circuit 16 supplies a plurality of horizontal drive signals (i.e., pH pulse signal) to the column circuit 15. In this way, the circuit 16 executes the control so that a pixel signal equivalent to one row previously latched by the column circuit 15 is output outside.

The outside of the imaging area 10 is formed with a serial interface (serial IF) 17, a timing generator circuit 18, a vertical line reset circuit 19, a vertical line read circuit 20, a pulse selector circuit 21 and a bias generator circuit 22. The serial interface 17 receives a command data DATA externally, and then, supplies the received data to the timing generator circuit 18. The timing generator circuit 18 is supplied with a master clock signal MCK externally. Based on The control data DATA and master clock signal MCK, the timing generator circuit 18 generates the following various signals. For example, one is a reset signal HRS and a clock signal HCK for controlling the operation of the column read circuit 16. Another is various pulse signals φESI, φESH and φHW for controlling the operation of the vertical line reset circuit 19. Another is various pulse signals φVRI and φHRO for controlling the operation of the vertical line read circuit 20. Another is various timing signals VREAD, READ, RESET and ADRES supplied to the pulse selector circuit 21. The pulse signals φESI, φESH and φHW are generated by a storage time control circuit 23 included in the timing generator circuit 18. The storage time control circuit 23 has an operation circuit. The operation circuit executes an operation based on a storage time control data ESDATA supplied by way of the serial interface 17 to generate The pulse signals φESI, φESH and φHW. The bias generator circuit 22 generates a constant bias voltage VVL. This bias voltage VVL is concurrently supplied to each gate electrode of the load transistors TL.

The vertical line reset circuit 19 generates a plurality of shutter control signals ESi for an electronic shutter (i denotes an arbitrary row of the imaging area 10, that is, i=1, . . . n, . . . m, . . . ) (and so forth) based on pulse signals φESI, φESH and φHW generated by the storage time control circuit 23. Further, the circuit 19 is divided into two blocks 19A and 19B in the row direction of the imaging area 10. The imaging area 10 is divided into two in the row direction. One block 19A of the circuit 19 generates a plurality of vertical line shutter control signals ESi corresponding to a plurality of unit pixels positioned on the upper side of the imaging area. The other block 19B of the circuit 19 generates a plurality of vertical line shutter control signals ESi corresponding to a plurality of unit pixels positioned on the lower side of the imaging area. The vertical line read circuit 20 generates a plurality of read control signals ROi based on pulse signals φVRI and φHRO generated by the timing generator circuit 18. The shutter control signals generated by the vertical line reset circuit 19 and the read control signals ROi generated by the vertical line read circuit 20 are both supplied to the pulse selector circuit 21.

The pulse selector circuit 21 generates the following pulse signals based on timing signals VREAD, RREAD, RESET and ADRES generated by the timing generator circuit 18, shutter control signal ESi and read control signal ROi. One is a plurality of pulse signals φADRESi for controlling the vertical select transistor Ta of each unit pixel 11 at a unit of a vertical line (unit of row). Another is a plurality of pulse signals φRESETi for controlling the reset transistor Tc of each unit pixel 11 at a unit of a vertical line. Another is a plurality of pulse signals φREADi for controlling the read transistor Td of each unit pixel 11 at a unit of a vertical line. The pulse signals φADRESi, φRESETi and φREADi are supplied to the unit pixel 11 of each row by way of a plurality of row select lines 12, reset line 13 and read lines 14, respectively.

In this case, the vertical line reset circuit 19, vertical line read circuit 20 and pulse selector circuit 21 drive the unit pixels 11 included in the imaging area 11 at a unit of row. In addition, these circuits 19, 20 and 21 form a vertical line drive circuit for setting a signal storage time of a photodiode PD of the driven unit pixel 11.

In the CMOS image sensor of FIG. 3, one vertical line of the imaging area is selected based on the read control signals ROi generated by the vertical line read circuit 20. Then, signal charges stored in the photodiodes PD of the selected vertical line are concurrently read to a plurality of vertical signal lines VLIN. In this case, the following settings are made before selection by the vertical line read circuit 20. Namely, signal charges stored in the photodiodes PD of the vertical line separating by a fixed number of lines from a vertical line selected by the vertical line read circuit 20 are previously discharged based on the shutter control signals ESi generated by the vertical line reset circuit 20. The signal storage time of each photodiode PD is equivalent to the difference of the vertical line between a vertical line selected by the vertical line read circuit 20 and a vertical line selected by the vertical line reset circuit 19. The control of the signal storage time is carried out by the storage time control circuit 23. Specifically, based on storage time control data ESDATA, the storage time control circuit 23 executes a predetermined operation to control the pulse width of a pulse signal φESI and the period of a pulse signal φESH and the number of pulses.

In each unit pixel 11, the pulse signal φRESETi is activated to set the gate electrode of amplifier transistor Tb, that is, the detection node DN to a reference voltage (reset level) before a signal charge stored in the photodiode PD is read. In this way, reset transistor Tc is turned on; therefore, the detection node DN is set to a reset level of power supply voltage VDD. Thereafter, the reset level is output to the corresponding vertical signal line VLIN, and then, supplied to the column circuit 15. Further, the pulse signal φREADi is activated; therefore, read transistor Td is turned on. In this way, a signal charge stored in the photodiode PD is read to the detection node DN. Furthermore, in order to select one vertical line for one-horizontal period of a vertically effective scanning period, the pulse signal φADRESi is activated; therefore, vertical select transistor Ta is turned on. In this way, a source follower circuit comprising amplifier transistor Tb and load transistor TL is operated. In this case, the vertical signal line VLIN is supplied with a signal level added to the reset level. Thereafter, in the column circuit 15, the reset level is removed by a noise cancel operation to extract a signal component only, and further, converted into a digital signal.

For example, the vertical line reset circuit 19, vertical line read circuit 20 and column circuit 15 are configurable using a shift register circuit or a decoder circuit.

In the CMOS image sensor of this embodiment, the storage time control circuit 23 controls the row select operation of the vertical line reset circuit 9 in the following manner. Namely, the control is carried out so that the signal storage time of a photodiode PD of the unit pixel 11 of a row positioned at the center of the imaging area 10 becomes the shortest. Conversely, the control is carried out so that the signal storage time of a photodiode PD toward rows positioned at upper and lower ends of the imaging area 10 becomes the long. The row select operation by the vertical line reset circuit 19 will be detailedly explained later.

Figure 4:
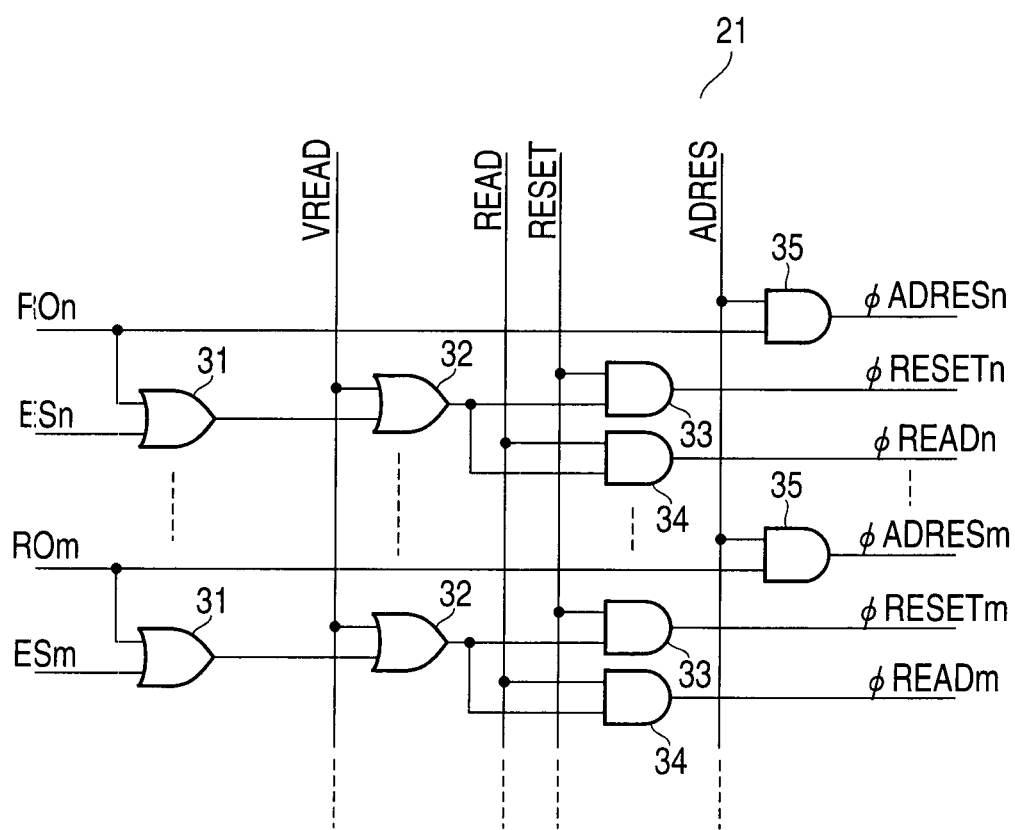
FIG. 4 is a circuit diagram showing the detailed configuration of a pulse selector circuit shown in FIG. 3.
Figure 5:
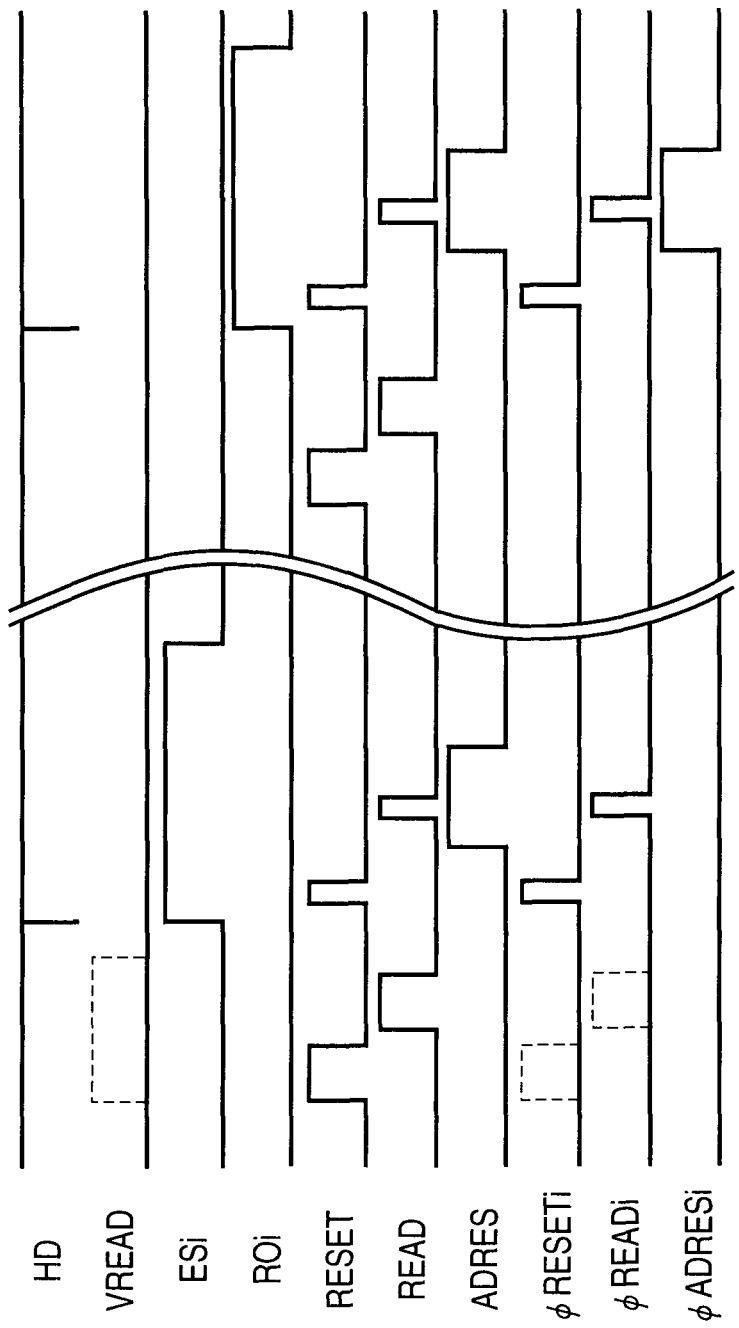
FIG. 5 is a timing chart to explain one example of the operation of the pulse selector circuit shown in FIG. 4.

FIG. 4 is a circuit diagram showing the detailed configuration of a pulse selector circuit 21 shown in FIG. 3. FIG. 5 is a timing chart to explain one example of the operation of the pulse selector circuit 21. The shutter control signal ES (ESn, ESm, etc.) generated by the vertical line reset circuit 19 and the read control signal RO (Ron, Rom, etc.) generated by the vertical line read circuit 20 are supplied to an OR gate circuit 31. An output signal of the OR gate circuit 31 is supplied to an OR gate circuit 32 together with a timing signal VREAD. An output signal of the OR gate circuit 32 is supplied to an AND gate circuit 33 together with a timing signal RESET. The AND gate circuit 33 outputs a pulse signal φRESET (φRESETn, φRESETm, etc.). Further, the output signal of the OR gate circuit 32 is supplied to an AND gate circuit 34 together with a timing signal READ. The AND gate circuit 34 outputs a pulse signal φREAD (φREADn, φREADm, etc.). Moreover, the read control signal RO is supplied to an AND gate circuit

35 together with a timing signal ADRES. The gate circuit 35 outputs a pulse signal φADRES (φADRESn, φADRESm, etc.).

As shown in FIG. 5, when shutter control signal ESi and timing signal RESET are both a level H (high), a pulse signal φRESETi is output while when shutter control signal ESi and timing signal READ are both a level H (high), a pulse signal φREADi is output. Likewise, when read control signal ROi and timing signal RESET are both a level H (high), a pulse signal φRESETi is output while when read control signal ROi and timing signal READ are both a level H (high), a pulse signal φREADi is output. In addition, when read control signal ROi and timing signal ADRES are both a level H (high), a pulse signal φADRESi is output. Moreover, when timing signal VREAD is a level H, timing signal RESET is set to a level H, and thereby, a pulse signal φRESETi is output. Likewise, when timing signal VREAD is a level H, timing signal READ is set to a level H, and thereby, a pulse signal φREADi is output. When timing signal VREAD is a level H, pulse signals φRESET and φREAD are output to unit pixels of all rows. This operation is called as a global reset operation of simultaneously resetting all pixels.

As described above, the vertical line reset circuit 19 and the vertical line read circuit 20 are configured using a shift register circuit or a decoder circuit, and controlled by the timing generator circuit 18 to select a predetermined vertical line (row). In particular, when the vertical line reset circuit 19 and vertical line read circuit 20 are configured using a shift register circuit, a logic circuit is incorporated in their circuits to perform the following settings. Specifically, as seen from FIG. 5, shutter control signal ESi and read control signal ROi are set to a level H in the first half of one horizontal period of a horizontal synchronizing signal HD. In the second half of one horizontal period (1HD), timing signal VREAD is input.

Figures 6A, 6B:
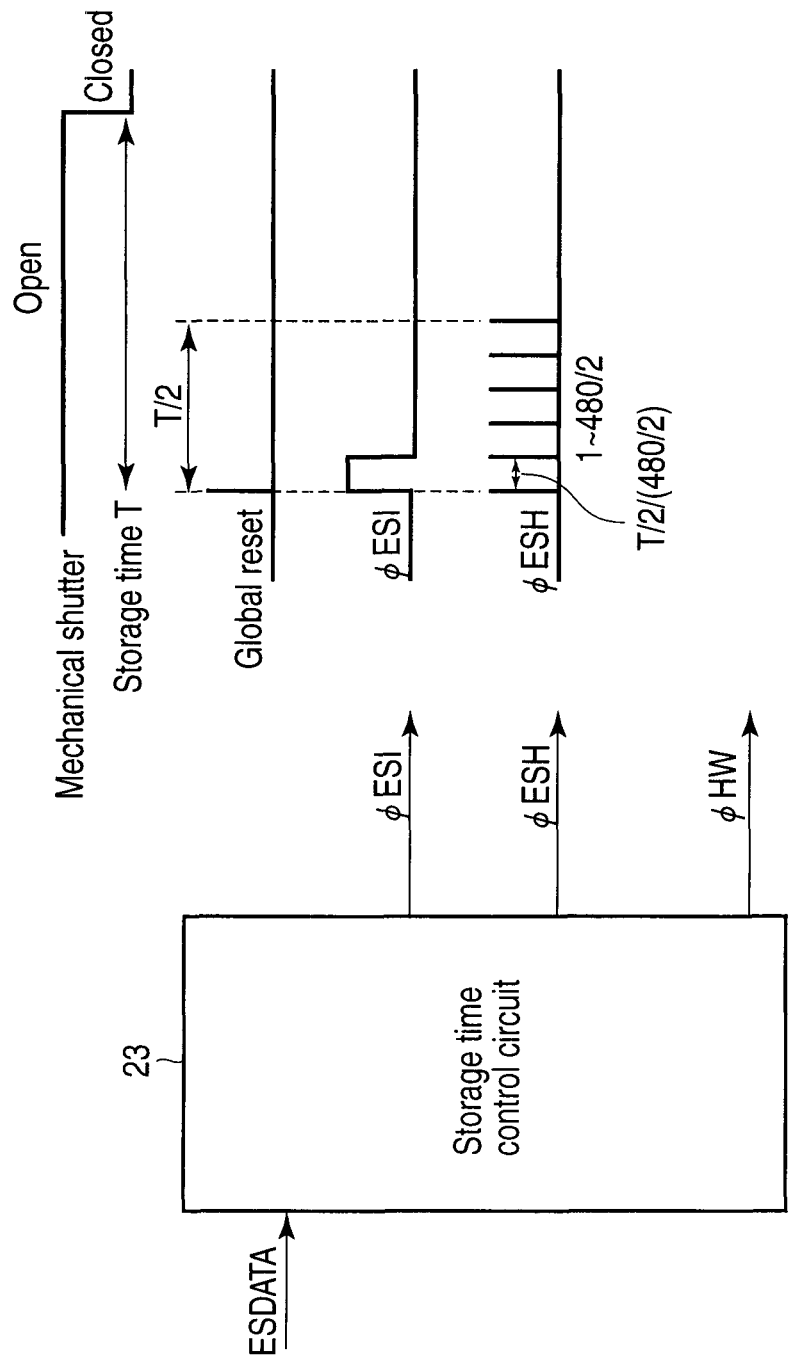
FIG. 6A is a block diagram showing the configuration of a storage time control time circuit shown in FIG. 3.
FIG. 6B is a timing chart showing a part of various pulse signals generated by the storage time control circuit of FIG. 6A.

FIG. 6A is a block diagram showing the configuration of the storage time control time circuit 23 shown in FIG. 3. FIG. 6B is a timing chart showing pulse signals φESI and φREH generated by the storage time control circuit 23. The storage time control circuit 23 is a circuit for controlling the vertical line reset circuit 19 when a mecha-shutter (i.e., mechanical shutter) is operated.

FIG. 7 is a block diagram showing one example of the configuration of a digital camera including a mechanical shutter (mecha-shutter). In FIG. 7, an imaging device 41 is equivalent to a CMOS image sensor shown in FIG. 3, for example. The digital camera is incorporated with an optical lens 42 and a mechanical shutter 43. Specifically, the optical lens 42 collects light from a subject, and then, irradiates the collected lights onto an imaging area of the imaging device 41. The mechanical shutter 43 blocks off lights irradiated to the imaging area. A subject image irradiated on the imaging area is converted into an electric signal by the imaging device 41, and then, color-processed by a signal processing circuit 44, and thereafter, supplied to a CPU (central processing unit) 45. The quantity of lights irradiated on the imaging area is operated by the CPU 45. When a shooting start (shooting ON) signal is input, an open/close signal of the mechanical shutter 43 and a command data (e.g., storage time control ESDATA, etc.) for controlling the imaging device 41 are output from the CPU 45. The open/close signal of the mechanical shutter is supplied to the mechanical shutter 43 by way of a driver 46.

The storage time control circuit 23 shown in FIG. 6A is supplied with a storage time control data ESDATA, which is given as information of a signal storage time T according to the quantity of lights operated by the CPU 45 shown in FIG. 7. Based on the supplied input data ESDATA, the storage time control circuit 23 executes the following control. Namely, the circuit 23 controls the pulse width of a pulse signal φESI, the period of a pulse signal φESH, and the number of pulses so that the row select operation by the vertical line reset circuit 19 ends for a period of ½ of the signal storage time T. Now, if the number of vertical lines of the imaging area 10 of the image sensor shown in FIG. 3 is 480, the half, that is, ½ of 480 lines is 240 lines. As described above, the vertical line reset circuit 19 is configured using a shift register circuit. In this case, blocks 19A and 19B of the vertical line reset circuit 19 each select the half, that is, 240 lines of the whole vertical lines of the imaging area 10, that is, 480 lines. The transfer interval of individual shift register circuits of blocks 19A and 19B of the vertical line reset circuit 19 is calculated as T/2/240. The storage time control circuit 23 generates a pulse signal φESH by 240 pulses at the period while generates a pulse signal φESI having a pulse width equivalent to one period of the pulse signal φESH. The pulse signal φESI is input as a shift data from the upper side of the imaging area 10 with respect to the block 19A selecting the vertical lines of the upper-half area in the vertical direction of the imaging area 10. Moreover, the pulse signal φESI is input as a shift data from the lower side of the imaging area 10 with respect to the block 19B selecting the vertical lines of the lower-half area in the vertical direction of the imaging area 10. The pulse signal φESH is input to each of blocks 19A and 19B as a shift clock signal of the shift register circuit. In this way, the signal storage time is controlled as described before. Namely, the signal storage time of the photodiode PD of the unit pixel 11 of the row positioned at the center of the imaging area 10 is set to the shortest. Further, the signal storage time becomes long toward rows positioned at upper and lower ends of the imaging area 10.

Figure 8:
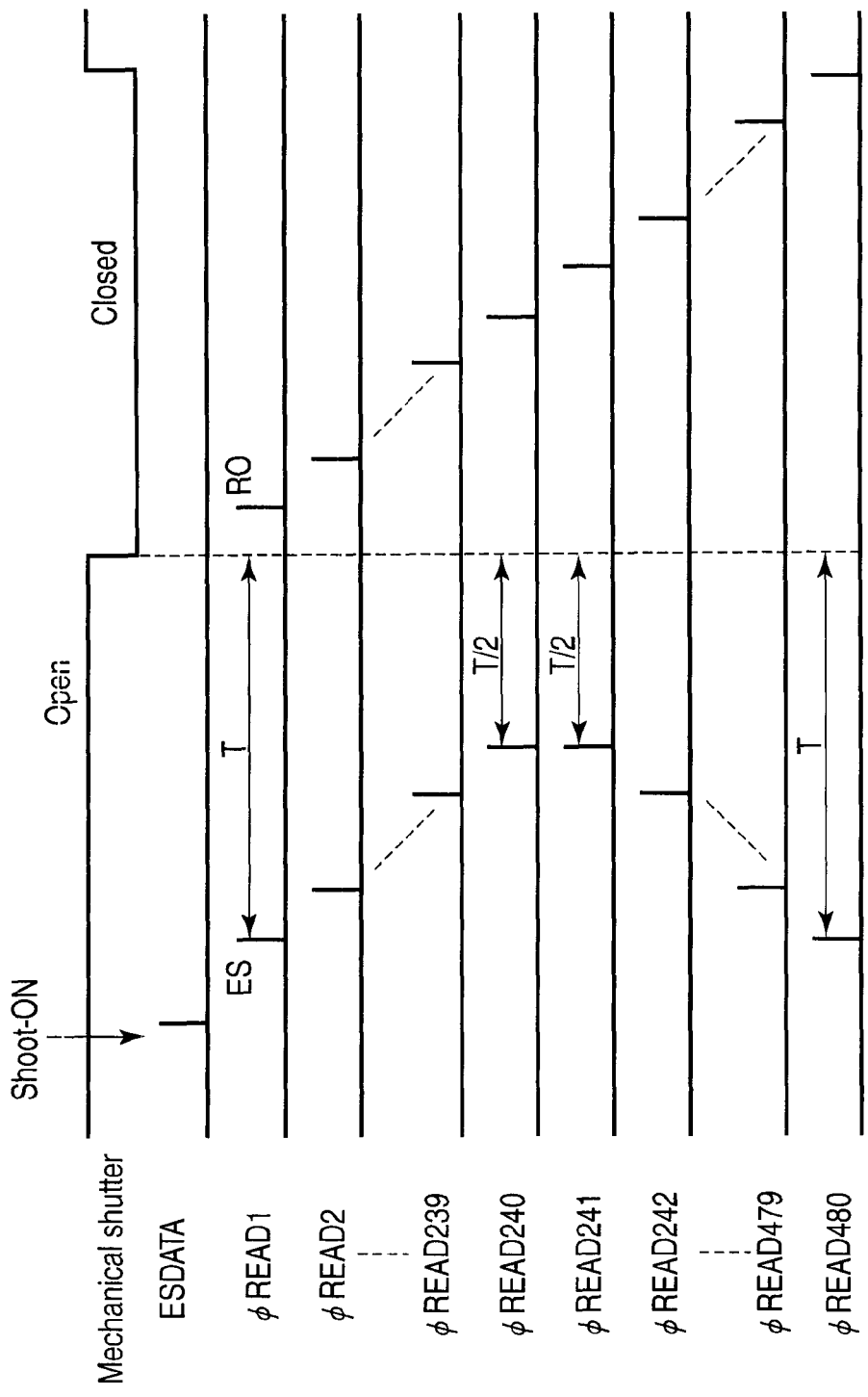
FIG. 8 is a timing chart showing one example of the operation of an image sensor shown in FIG. 3.

FIG. 8 is a timing chart showing one example of the operation of an image sensor shown in FIG. 3. Namely, FIG. 8 shows various pulse signals, which are output from the pulse selector circuit 21 of FIG. 3, and supplied to the imaging area 10 by way of a plurality of row select lines 12, reset lines 13 and read lines 14. In FIG. 8, there are typically shown a pulse signals φREAD supplied to the gate electrode of read transistor Td. Moreover, in FIG. 8, a numerical value added to the end of the pulse signal φREAD denotes a supplied vertical line (row). In this case, a smaller numerical value shows a vertical line close to the upper end in the vertical direction of the imaging area 10. Therefore, a vertical line supplied with a pulse signal φREAD1 is positioned at the uppermost end of the imaging area 10 in the vertical direction. Further, a vertical line supplied with a pulse signal φREAD480 is positioned at the lowermost end of the imaging area 10 in the vertical direction. Vertical lines supplied with pulse signals φREAD240 and φREAD241 are positioned at the center of the imaging area 10 in the vertical direction.

When a shooting start (shooting ON) signal input to a digital camera, storage time control data ESDATA previously calculated by the CPU 45 shown in FIG. 7 is input to the imaging device 41. In the imaging device 41, the pulse width of a pulse signal φESI, the period of a pulse signal φESH and the number of pulses are determined by the operation of an operation circuit included in the storage time control circuit 23, and thereafter, input to the vertical line reset circuit 19. The vertical line reset circuit 19 output a shutter control signal ES according pulse signals φESI and φESH. In this case, the upper end of the block 19A of the vertical line reset circuit 19 selecting a plurality of vertical lines of the upper-half area of the imaging area 10 in the vertical direction is supplied with a pulse signal φESI. On the other hand, the lower end of the block 19B of the vertical line reset circuit 19 selecting a plurality of vertical lines of the lower-half area of the imaging area 10 in the vertical direction is supplied with a pulse signal φESI. As a result, the shutter control signal ES output from the vertical line reset circuit 19 is supplied to vertical lines positioned on upper and lower end portions of the imaging area 10 in the vertical direction at the earliest timing. Conversely, the signal ES is supplied to vertical lines positioned on the center of the imaging area 10 in the vertical direction at the latest timing. Therefore, timing is successively shifted. In other words, a pulse signal φREAD output from the pulse selector circuit 21 based on these shutter control signals ES is successively shifted in its timing. Specifically, as seen from FIG. 8, pulse signals φREAD1 and φREAD480 corresponding to the vertical lines on upper and lower end portions of the imaging area 10 in the vertical direction are supplied at the earliest timing. Conversely, pulse signals φREAD240 and φREAD241 corresponding to the vertical lines on the center portions of the imaging area 10 in the vertical direction are supplied at the latest timing. Thus, the signal storage time of the unit pixel 11 controlled by pulse signals φREAD240 and φREAD241 is set to the shortest T/2. In this case, the shortest signal storage time is not limited to T/2, and the time may be arbitrarily set by the storage time control circuit 23. Moreover, the signal storage time of each unit pixel 11 is equivalent to time until a mechanical shutter is closed after a pulse signal φREAD is output from the pulse selector circuit 21 based on the shutter control signal ES. Signal read from each unit pixel 11 is carried out according to a pulse signal φREAD is output from the pulse selector circuit 21 based on a read control signal RO after a mechanical shutter is closed.

According to the operation, the control is carried out so that the signal storage time of a photodiode of the unit pixel of the vertical line positioned on the center of the imaging area 10 is the shortest while it becomes long toward rows positioned on upper and lower ends thereof. In other words, the signal storage time is set in accordance with the number of vertical lines vertically separating from the vertical line positioned on the center of the imaging area 10, and in this way, a signal storage is increased. As a result, this serves to improve an SNR of peripheral areas of the imaging area 10 in the vertical direction. According to this embodiment, the signal storage time of vertical lines on both end portions of the imaging area 10 in the vertical direction becomes twice of the center thereof, and also, the quantity of lights becomes twice. Therefore, a shot noise is remarkably improved.

Figure 9:
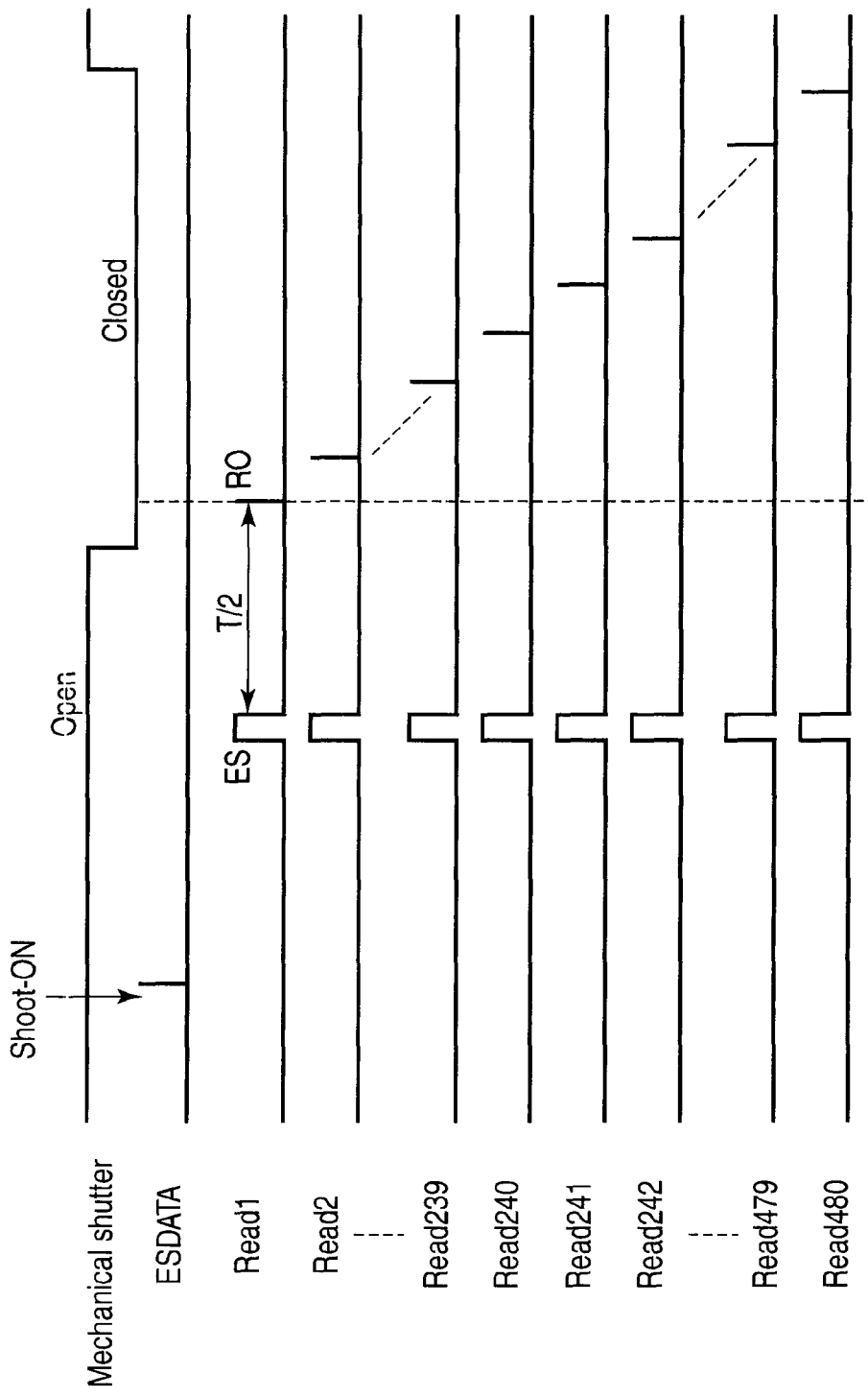
FIG. 9 is a timing chart showing various pulse signals based on a normal global reset operation.

FIG. 9 is a timing chart showing a pulse signal φREAD based on a normal global reset operation to make a comparison with this embodiment. In this case, the signal storage time is set to T/2 in all vertical lines so that a signal of a unit pixel of the center vertical line is not saturated. For this reason, it is impossible to improve a reduction of SNR based on a reduction of the quantity of lens peripheral lights.

Second Embodiment

FIG. 10 is a block diagram showing the configuration of a CMOS image sensor according to a second embodiment. This second embodiment differs from the first embodiment in the following point. Namely, a storage time control circuit 23 supplies pulse signals φESIA and φESIB independently to blocks 19A and 19B of a vertical line reset circuit 19 divided into two parts. Specifically, the storage time control circuit 23 generates two kinds of pulses signals φESIA and φESIB. One pulse signals φESIA is supplied to one block 19A of the vertical line reset circuit 19 while the other φESIB is supplied to the other block 19B thereof. In this case, the two kinds of pulses signals φESIA and φESIB are input as shift data from the upper end of both blocks 19A and 19B. These blocks 19A and 19B of the vertical line reset circuit 19 select vertical lines from the upper end toward the lower end. A pulse selector circuit 21 is divided into two blocks, that is, block 21A and block 21B in the row direction of an imaging area 10. The imaging area 10 is divided into two parts in the row direction. One block 21A of the pulse selector circuit 21 outputs a plurality of pulse signals φADRESi, φRESETi and φREADi to a plurality of row select lines 12, reset lines 13 and read lines 14 of the upper-half area of the imaging area 10. The other block 21B outputs a plurality of pulse signals φADRESi, φRESETi and φREADi to a plurality of row select lines 12, reset lines 13 and read lines 14 of the lower-half area of the imaging area 10.

The CMOS image sensor of this second embodiment is applicable to a digital camera, which executes a rolling shutter operation and does not use a mechanical shutter. Moreover, the CMOS image sensor of this embodiment I capable of performing a global reset operation at the lower-half area of the imaging area 10 in the vertical direction. A timing generator circuit 18 generates a timing signal VREADB used for a global reset operation. The timing signal VREADB is supplied to the block 21B only of the pulse selector circuit 21.

Figure 11:
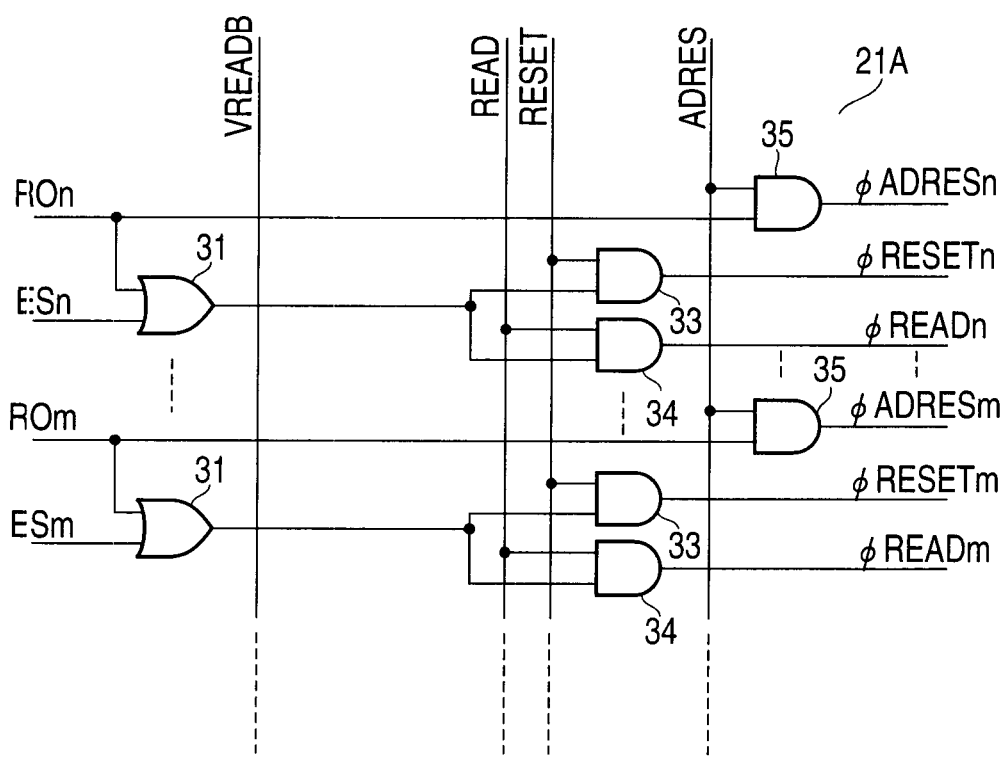
FIG. 11 is a circuit diagram showing the detailed configuration of one block of a pulse selector circuit comprising two blocks shown in FIG. 10.
Figure 12:
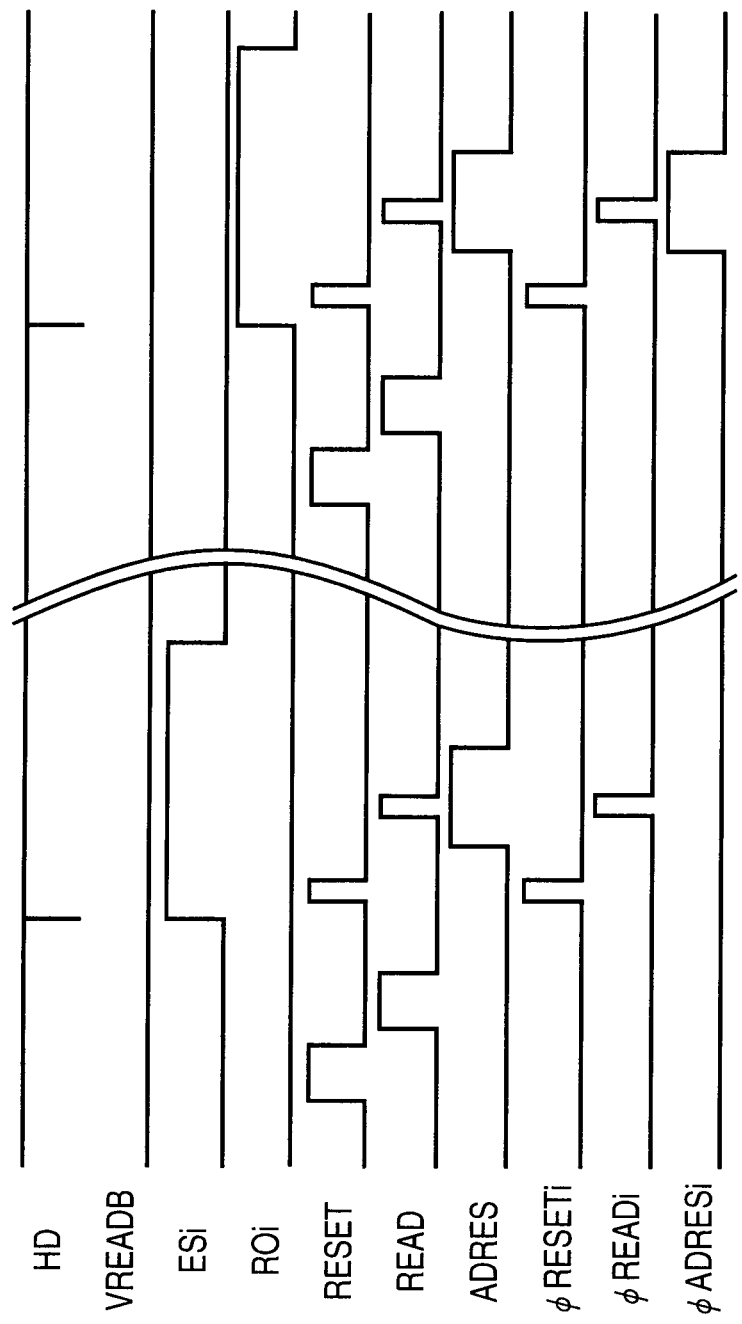
FIG. 12 is a timing chart showing the circuit shown in FIG. 11.

FIG. 11 is a circuit diagram showing the detailed configuration of one block 21A of a pulse selector circuit 21 shown in FIG. 10. FIG. 12 is a timing chart showing the circuit shown in FIG. 11. The block 21A is not supplied with a timing signal VREADB; therefore, an OR gate circuit 32 shown in FIG. 4 is omitted. AND gate circuits 33 and 34 are supplied with an output signal of an OR gate circuit 31 in place of an output signal of the OR gate circuit 32. Other points are the same as the circuit shown in FIG. 4; therefore, the explanation is omitted. A timing chart shown in FIG. 12 differs from FIG. 5 in the following point only. Namely, no timing signal VREADB exists, and a global operation is not carried out; therefore, the explanation is omitted.

Figure 14:
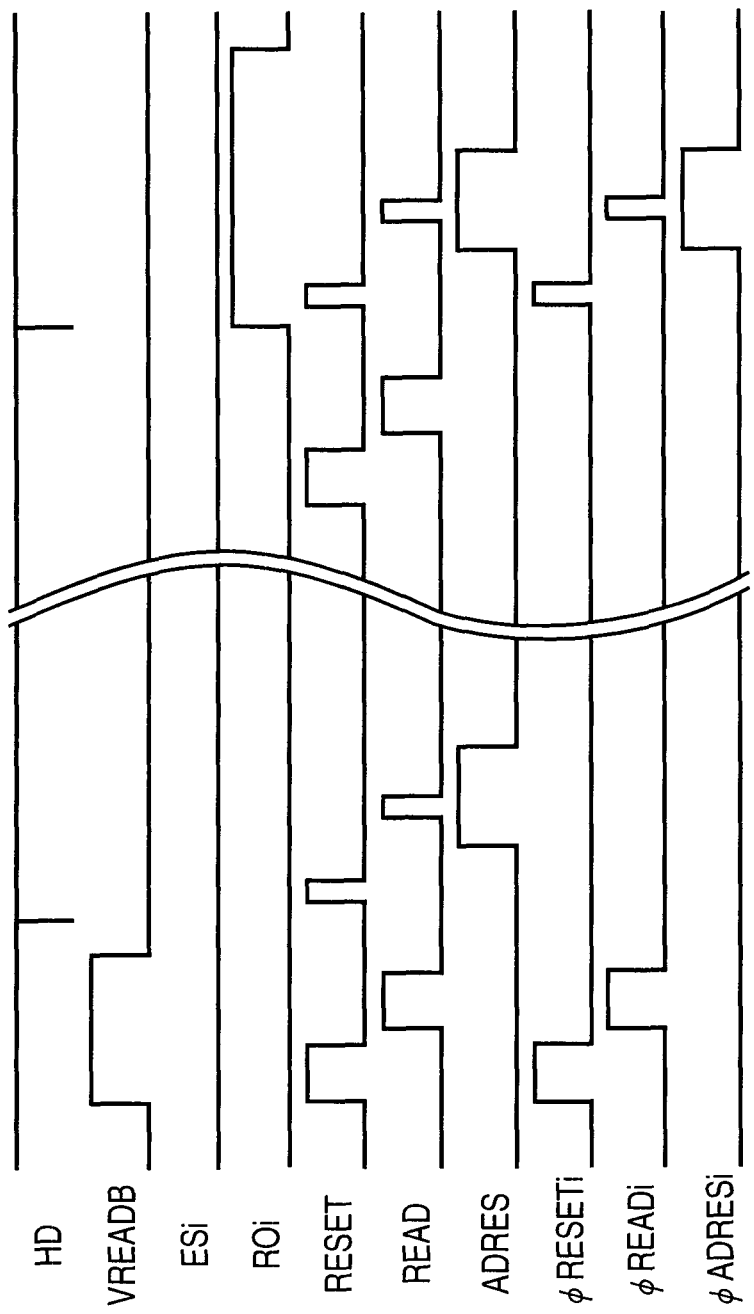
FIG. 14 is a timing chart showing the circuit shown in FIG. 13.

FIG. 13 is a circuit diagram showing the detailed configuration of the other block 21B of a pulse selector circuit 21 shown in FIG. 10. FIG. 14 is a timing chart showing the circuit shown in FIG. 13. The block 21B is supplied with a timing signal VREADB. The circuit of FIG. 13 is supplied with a timing signal VREADB in place of a timing signal VREAD. Other points are the same as FIG. 4; therefore, the explanation is omitted. A timing chart shown in FIG. 14 is the same as FIG. 5; therefore, the explanation is omitted.

Figure 15:
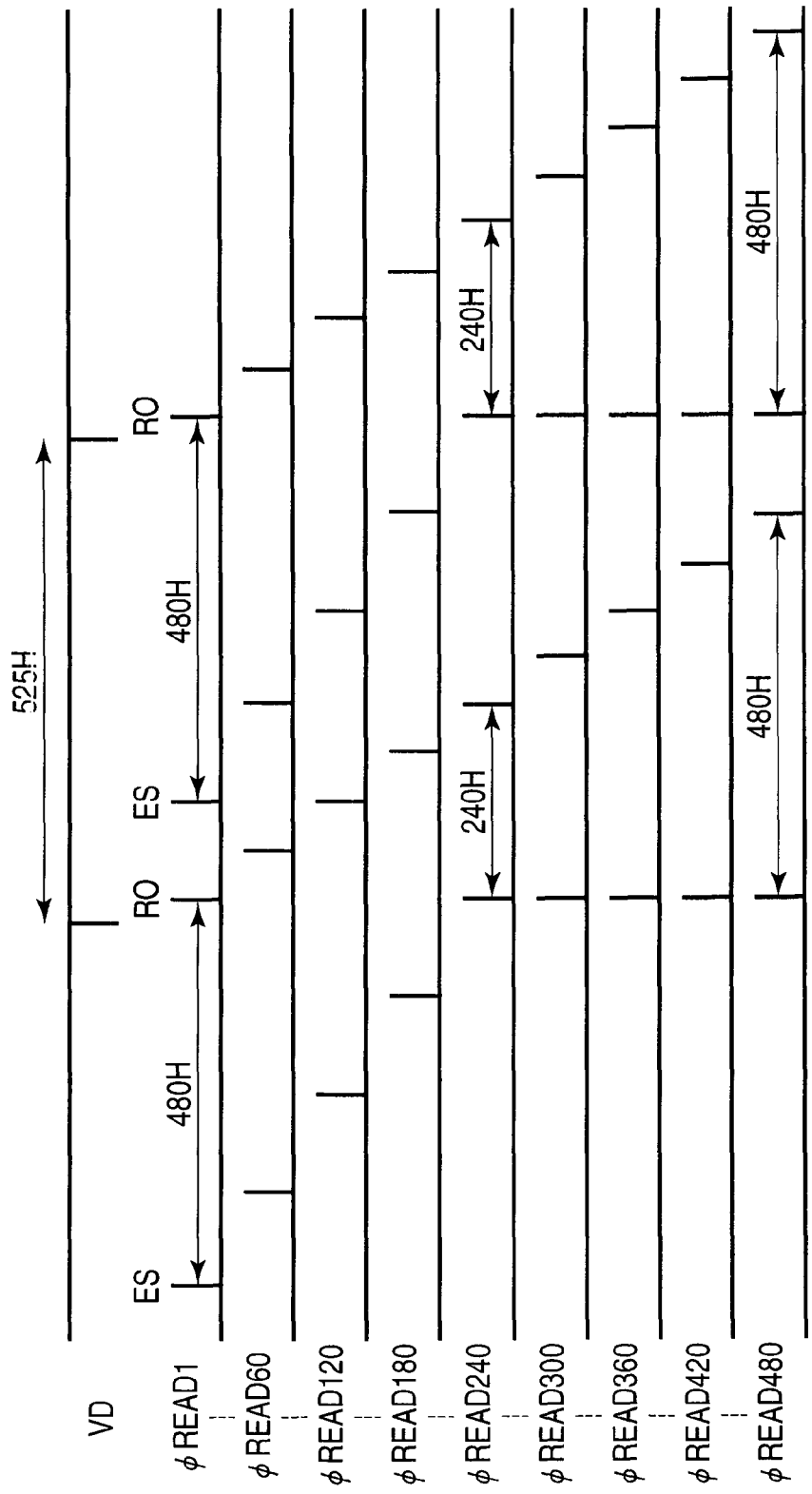
FIG. 15 is a timing chart showing one example of the operation of an image sensor shown in FIG. 10.

FIG. 15 is a timing chart showing one example of the operation of an image sensor shown in FIG. 10. FIG. 15 shows various pulse signals, which are output from a pulse selector circuit 21 shown in FIG. 10 and supplied to an imaging area 10 by way of a plurality of row select lines 12, reset lines and read lines 14. In FIG. 15, typically, a pulse signal φREAD supplied to the gate electrode of read transistor TD is shown. In FIG. 15, a numerical value added to the end of the pulse signal φREAD denotes a supplied vertical line (row). In this case, a smaller numerical value shows a vertical line close to the upper end in the vertical direction of the imaging area 10. Therefore, a vertical line supplied with a pulse signal φREAD1 is positioned at the uppermost end of the imaging area 10 in the vertical direction. Further, a vertical line supplied with a pulse signal φREAD480 is positioned at the lowermost end of the imaging area 10 in the vertical direction. A vertical lines supplied with pulse signals φREAD240 is positioned at the center of the imaging area 10 in the vertical direction.

A storage time control data ESDATA previously calculated by the CPU 45 of FIG. 7 is input to an imaging device 41. In the imaging device 41, each pulse width of pulse signals φESIA and φESIB, the period of a pulse signal φESH and the number of pulses are determined according to the operation by the storage time control circuit 23, and thereafter, output to the vertical line reset circuit 19. The vertical line reset circuit 19 outputs a shutter control signal ES according to the pulse signals φESIA, φESIB and φESH. In this case, for example, the signal storage time T of the uppermost vertical line (φREAD1) of the upper-half area of the imaging area 10 in the vertical direction is set to 480H (H denotes one horizontal period). A read control signal RO shifts 1H by 1H for each vertical line. A pulse signal φESH is supplied so that a shutter control signal ES output from the block 19A of the vertical line reset circuit 19 successively shifts 2H by 2H. Based on these shutter control signals, pulse signals φREAD1 to φREAD240 shift 2H by 2H, and thus, are output. As a result, the signal storage time of the unit pixel 11 controlled according to the pulse signal φREAD240 is 240H.

On the other hand, a timing signal VREADB is input to a plurality of vertical lines of the lower-half area of the imaging area 10 in the vertical direction. In this way, a global reset operation is simultaneously carried out in all vertical lines. Specifically, signal read is carried out according to the following pulse signals φREAD241 to φREAD480 in the lower-half area of the imaging area 10 in the vertical direction. The pulse signals φREAD241 to φREAD480 are output from the block 21B of the pulse selector circuit 21 based on a read control signal RO, and shifted 1H by 1H in their timing. As a result, the signal storage time of the unit pixel controlled according to pulse signals φREAD241 to φREAD480 increases 1H by 1H in a range from 241H to 480H.

Figure 16:
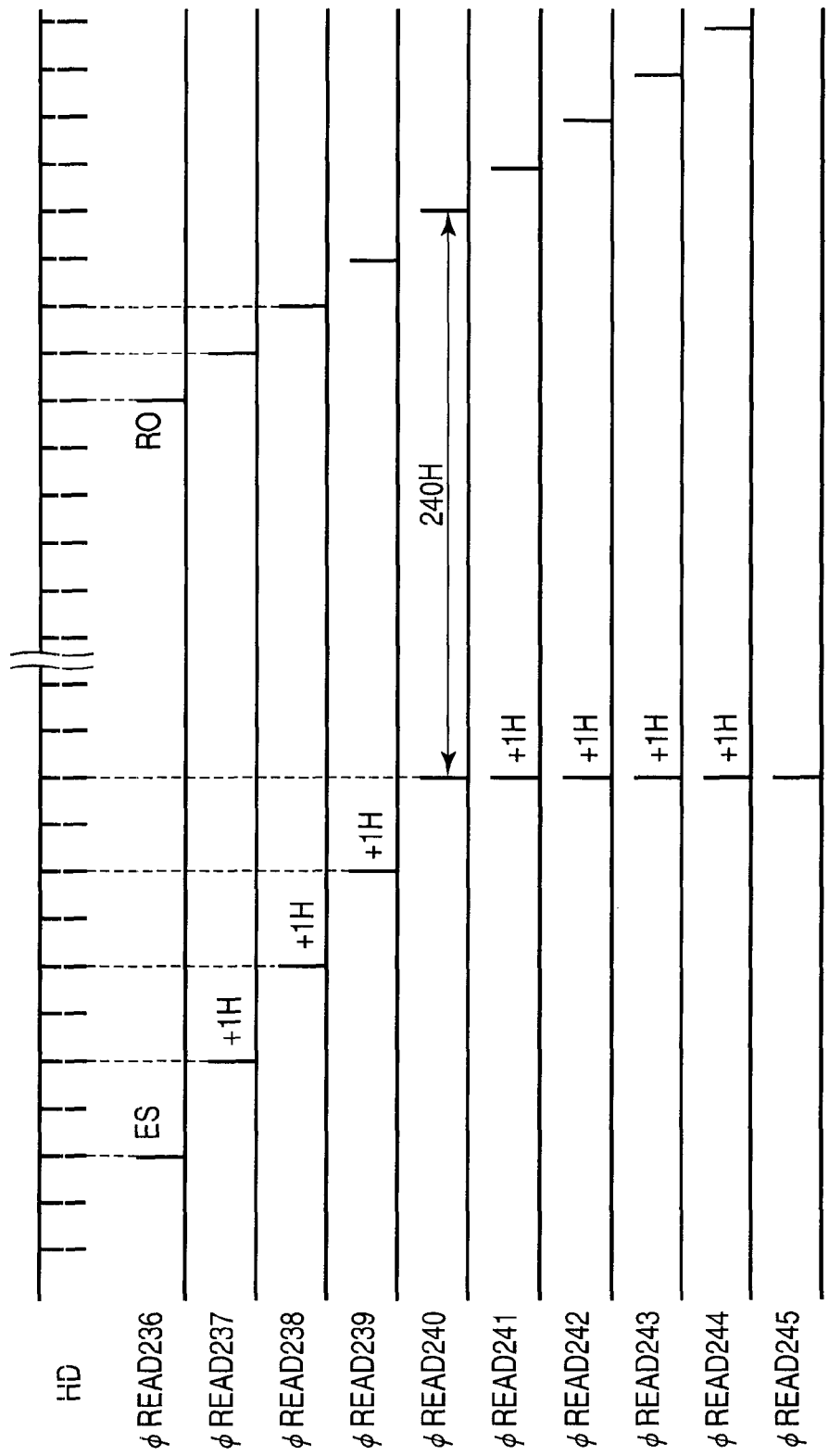
FIG. 16 is a timing chart showing a part of various pulse signals shown in FIG. 15.

FIG. 16 is a timing chart showing a part of various pulse signals shown in FIG. 15, that is, φREAD236 to φREAD245. A read control signal RO shifts 1H by 1H. A shutter control signal ES shifts 2H by 2H with respect to vertical lines corresponding to pulse signals φREAD236 to φREAD240. After the vertical line corresponding to the pulse signal φREAD241, a pulse signal φREAD is simultaneously generated based on a timing signal VREADB. The signal storage time successively increases 1H by 1H with respect to vertical lines corresponding to pulse signals φREAD236 to φREAD240, while successively increases 1H by 1H after the vertical line corresponding to the pulse signal φREAD241.

According t the operation, the following control is performed. Namely, the signal storage time of a photodiode of the unit pixel of the vertical line (line 240) positioned on the center of the imaging area 10 is set the shortest. Moreover, the signal storage time successively becomes long toward rows positioned on upper and lower ends of the imaging area 10. In other words, the signal storage time is set long in accordance with the number of vertical lines vertically separating from the vertical line positioned on the center of the imaging area 10; in this way, signal storage is increased. As a result, this serves to improve the SNR of peripheral areas of the imaging area in the vertical direction.

Figure 17:
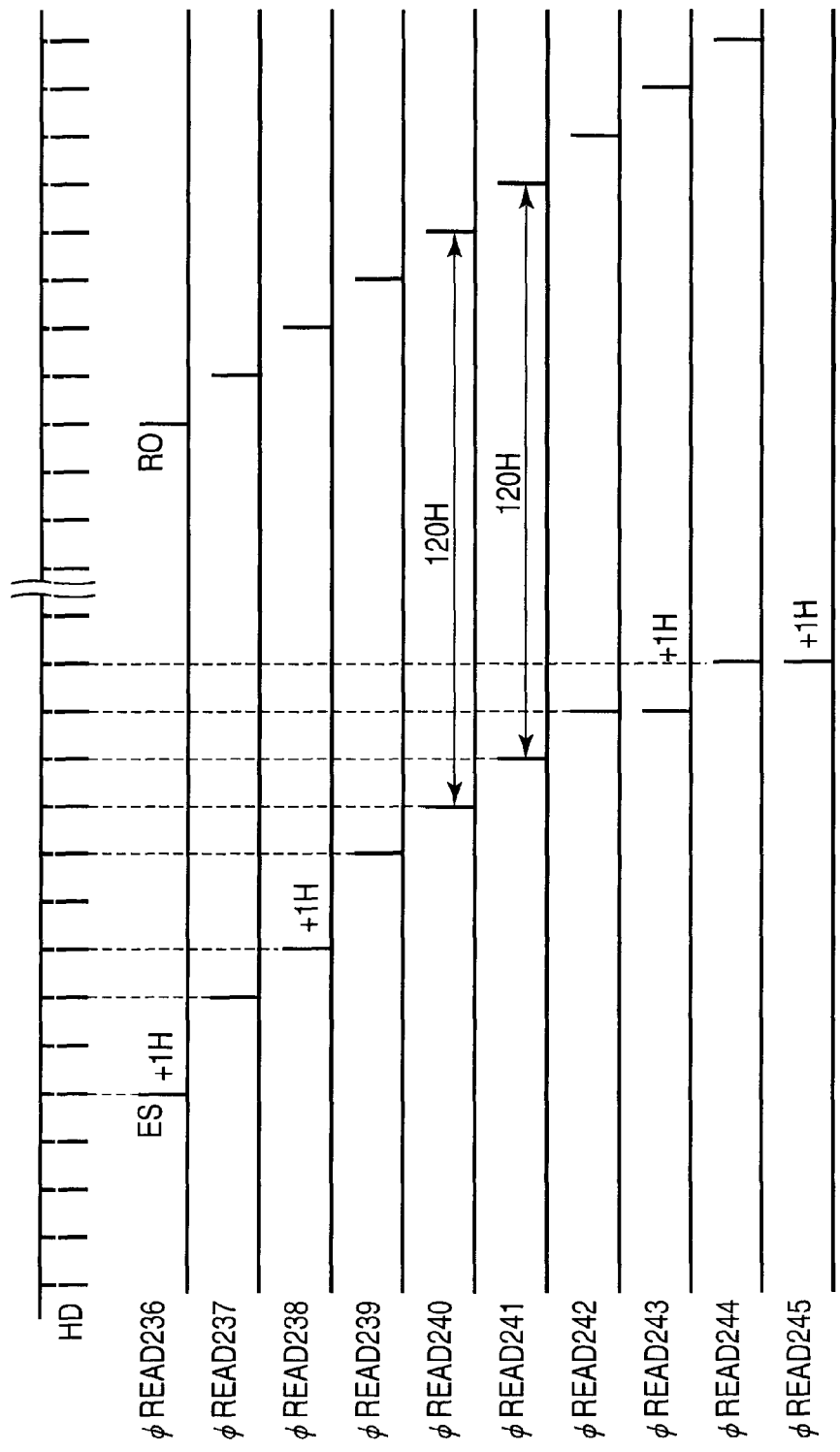
FIG. 17 is a timing chart showing another example of the operation of an image sensor shown in FIG. 10.

FIG. 17 is a timing chart showing another example of the operation of an image sensor shown in FIG. 10. Namely, FIG. 17 shows various pulse signals, which are output from the pulse selector circuit 21 of FIG. 10, and supplied to the imaging area 10 by way of a plurality of row select lines 12, reset lines 13 and read lines 14. In FIG. 17, there are typically shown a pulse signals φREAD supplied to the gate electrode of read transistor Td.

A storage time control data ESDATA previously calculated by the CPU 45 of FIG. 7 is input to an imaging device 41. In the imaging device 41, each pulse width of pulse signals φESIA and φESIB, the period of a pulse signal φESH and the number of pulses are determined by the storage time control circuit 23, and thereafter, output to the vertical line reset circuit 19. The vertical line reset circuit 19 outputs a shutter control signal ES according to the pulse signals φESIA, φESIB and φESH. In this case, for example, the following settings are made. Namely, each signal storage time T of the lowermost vertical line (φREAD240) of the upper-half area of the imaging area 10 in the vertical direction and the lowermost vertical line (φREAD241) of the lower-half area of the imaging area 10 in the same is set to 120H. A read control signal RO shifts 1H by 1H. In this case, a pulse signal φESH is supplied so that a shutter control signal ES shifts in the following manner. Specifically, a shutter control signal ES output from the block 19A of the vertical line reset circuit 19 alternately shifts 2H-and-1H by 2H-and-1H (i.e., 2H→1H→2H→1H). Further, a shutter control signal ES output from the block 19B successively shifts 1H by 1H for two vertical lines (i.e., 0H→0H→1H).

In this way, in the upper-half area of the imaging area 10 in the vertical direction, the signal storage time successively increases 0H, +1H, 0H, +1H toward vertical lines upper than the vertical line corresponding to the pulse signal φREAD240 given as a reference. Likewise, in the lower-half area of the imaging area 10 in the vertical direction, the signal storage time successively increases 0H, +1H, 0H, +1 toward vertical lines lower than the vertical line corresponding to the pulse signal φREAD241 given as a reference. As a result, each signal storage time of the vertical lines positioned on both upper and lower ends of the imaging area 10 in the vertical direction is 240H. Therefore, the time becomes twice as much as the signal storage time of the vertical line positioned on the center of the imaging area 10 in the vertical direction.

Figure 18:
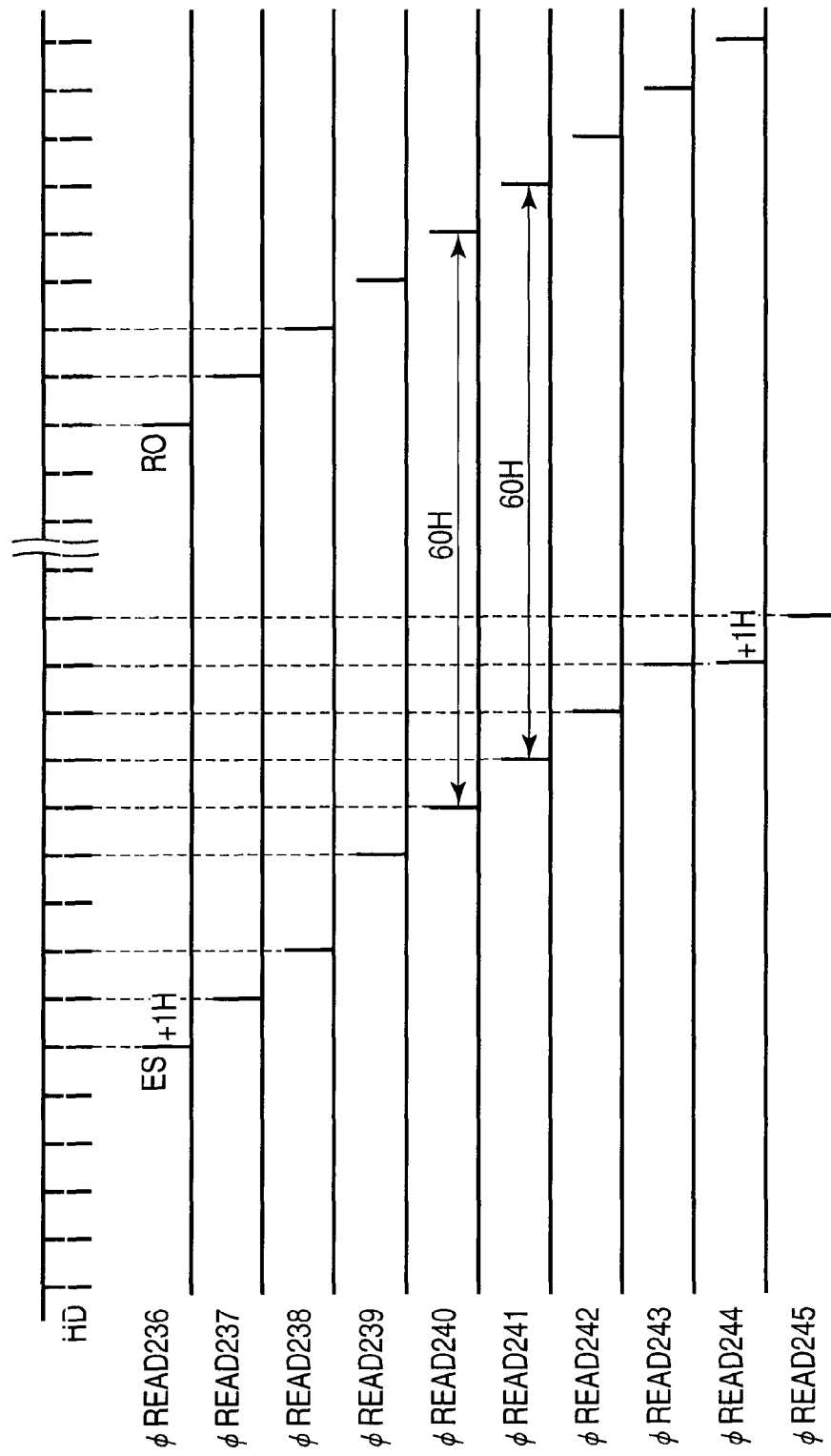
FIG. 18 is a timing chart showing still another example of the operation of an image sensor shown in FIG. 10.

FIG. 18 is a timing chart showing still another example of the operation of an image sensor shown in FIG. 10. Namely, FIG. 18 shows various pulse signals, which are output from the pulse selector circuit 21 of FIG. 10, and supplied to the imaging area 10 by way of a plurality of row select lines 12, reset lines 13 and read lines 14. In FIG. 18, there are typically shown a pulse signals φREAD supplied to the gate electrode of read transistor Td.

A storage time control data ESDATA previously calculated by the CPU 45 of FIG. 7 is input to an imaging device 41. In the imaging device 41, each pulse width of pulse signals φESIA and φESIB, the period of a pulse signal φESH and the number of pulses are determined by the storage time control circuit 23, and thereafter, output to the vertical line reset circuit 19. The vertical line reset circuit 19 outputs a shutter control signal ES according to the pulse signals φESIA, φESIB and φESH.

In this case, for example, the following settings are made. Namely, each signal storage time T of the lowermost vertical line (φREAD240) of the upper-half area of the imaging area 10 in the vertical direction and the lowermost vertical line (φREAD241) of the lower-half area of the imaging area 10 in the same is set to 60H. A read control signal RO shifts 1H by 1H.

In this case, a pulse signal φESH is supplied in the following manner. Namely, a shutter control signal ES output from the block 19A of the vertical line reset circuit 19 shifts 1H for each vertical line, and further, shifts a half of 1H at intervals of four vertical lines. In this way, in the upper-half area of the imaging area 10 in the vertical direction, the signal storage time successively increases 0H, +1H, 0H, +1 toward vertical lines upper than the vertical line corresponding to the pulse signal φREAD240 given as a reference.

Moreover, a pulse signal φESH is supplied in the following manner. Namely, a shutter control signal ES output from the block 19B of the vertical line reset circuit 19 shifts 1H for each vertical line, and further, shifts 0H at intervals of four vertical lines. In this way, in the lower-half area of the imaging area 10 in the vertical direction, the signal storage time successively increases 0H, 0H, 0H, +1H toward vertical lines lower than the vertical line corresponding to the pulse signal φREAD241 given as a reference.

As a result, each signal storage time of the vertical lines positioned on both upper and lower ends of the imaging area 10 in the vertical direction is 120H. Therefore, the time becomes twice as much as the signal storage time of the vertical line positioned on the center of the imaging area 10 in the vertical direction.

Figure 19:
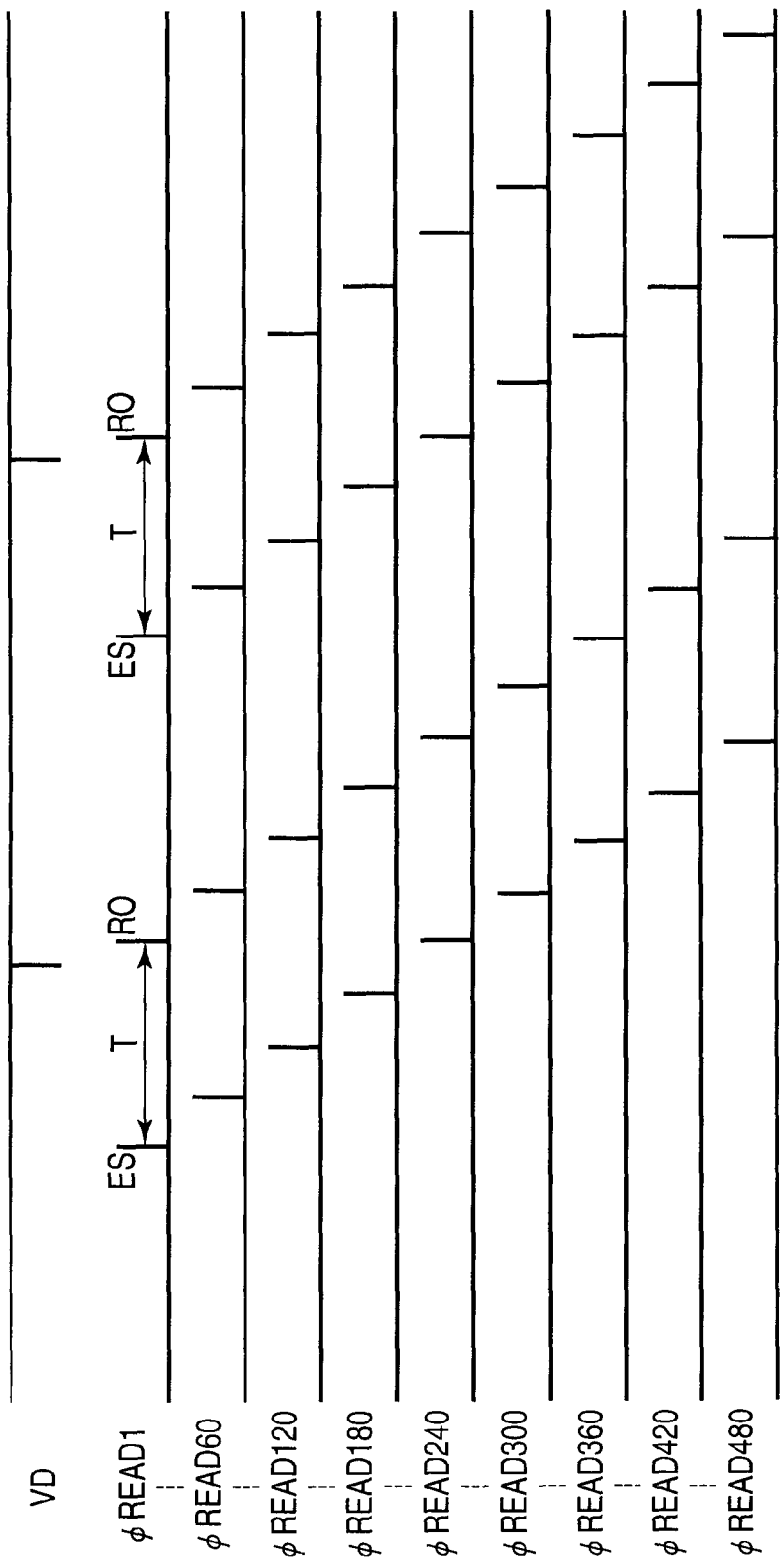
FIG. 19 is a timing chart showing various pulse signals based on a normal rolling shutter operation.

FIG. 19 is a timing chart showing various pulse signals φREAD based on a normal rolling shutter operation to make a comparison with the second embodiment. As can be seen from FIG. 19, the signal storage time T is all the same in a range from the first line (φREAD1) to the 480-th line (φREAD480). For this reason, it is impossible to improve a reduction of lens peripheral lights resulting from a reduction of SNR.

FIG. 20 is a circuit diagram showing one example of the detailed configuration of one and the other blocks 19A and 19B of the vertical line reset circuit 19 of CMOS image sensors according to the first and second embodiments. The two blocks 19A and 19B are both configured using a shift register circuit. In this case, a general D-type flip-flop circuit is used as the shift register circuit. Each of blocks 19A and 19B of the vertical line reset circuit 19 according to the first and second embodiments is provided with 240 shift register circuits 41 correspondingly to the number of vertical lines to be selected. These 240 shift register circuits 41 are cascade-connected so that an output signal of the pre-stage is input to the after-stage. The first-stage shift register circuit 41 is supplied with a pulse signal φESI as an input data. Clock input terminals of all shift register circuits 41 are concurrently supplied with a pulse signal (φESH. An output signal PESj (j=1 to 240 in block 19A, j=241 to 480 in block 19B) of each shift register circuit 41 is input to one input terminal of each of 240 AND gate circuits 42. The other terminal of each of these AND gate circuits 42 is supplied with a pulse signal φHW. A shutter control signal ESj is output from the AND gate circuits 42.

Figure 21:
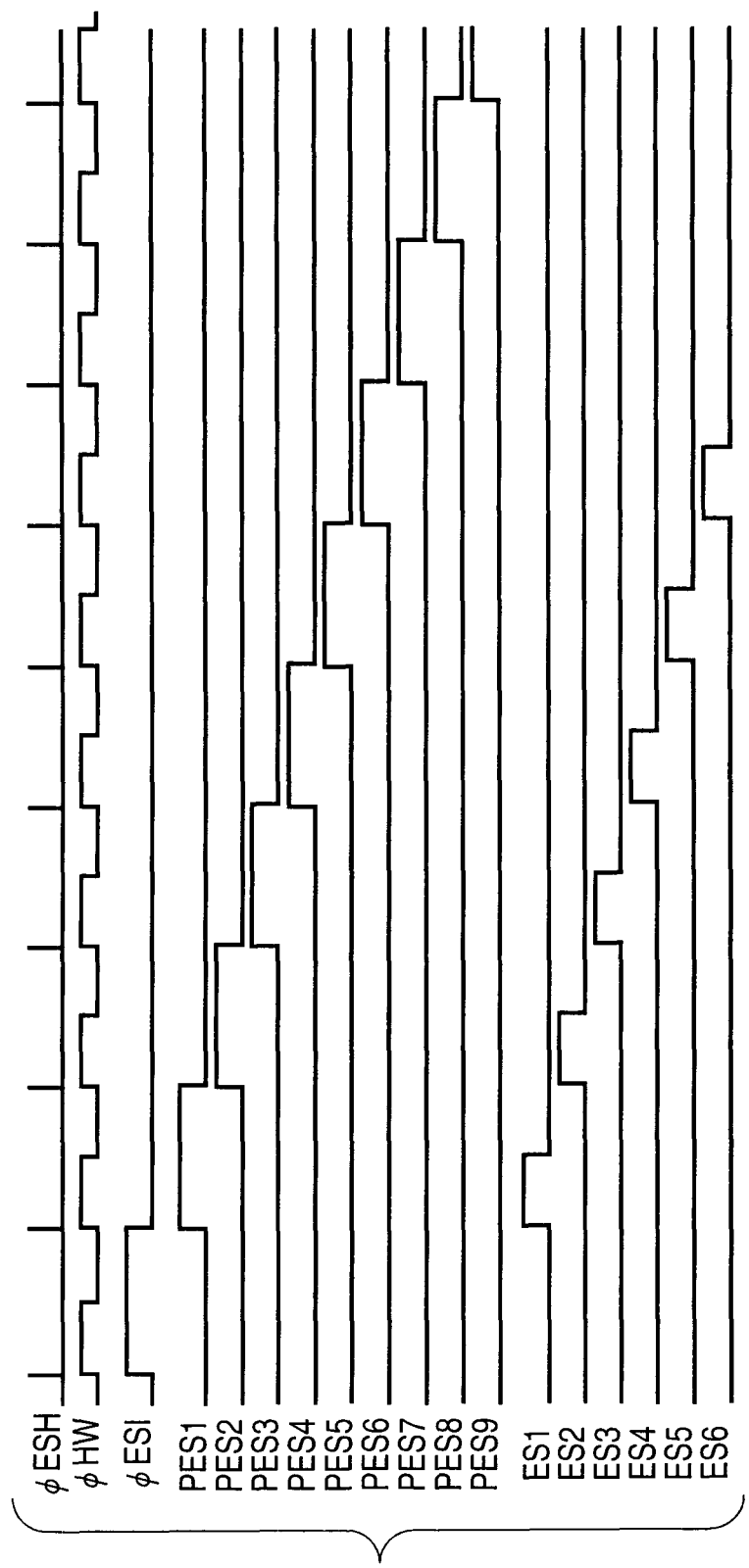
FIG. 21 is a timing chart showing one example of the operation of a vertical line reset circuit block shown in FIG. 20.

FIG. 21 is a timing chart showing one example of the operation of the vertical line reset circuit 19 shown in FIG. 20. A pulse signal φESH is synchronous with a horizontal synchronizing signal HD. A pulse signal φESI input to the first-stage shift register circuit 41 is synchronous with the pulse signal φESH so that 240 shift register circuits 41 are successively shifted 1H period by 1H period, and thereby, a pulse signal PESj is output. In this case, in order to generate a pulse signal ES for the first-half period only of 1H period, the logic of the pulse signal PESj with the pulse signal φHW is taken by means of each AND gate circuit 42. In this way, a shutter control signal ESj is generated in a state that its timing is successively shifted.

Figure 22:
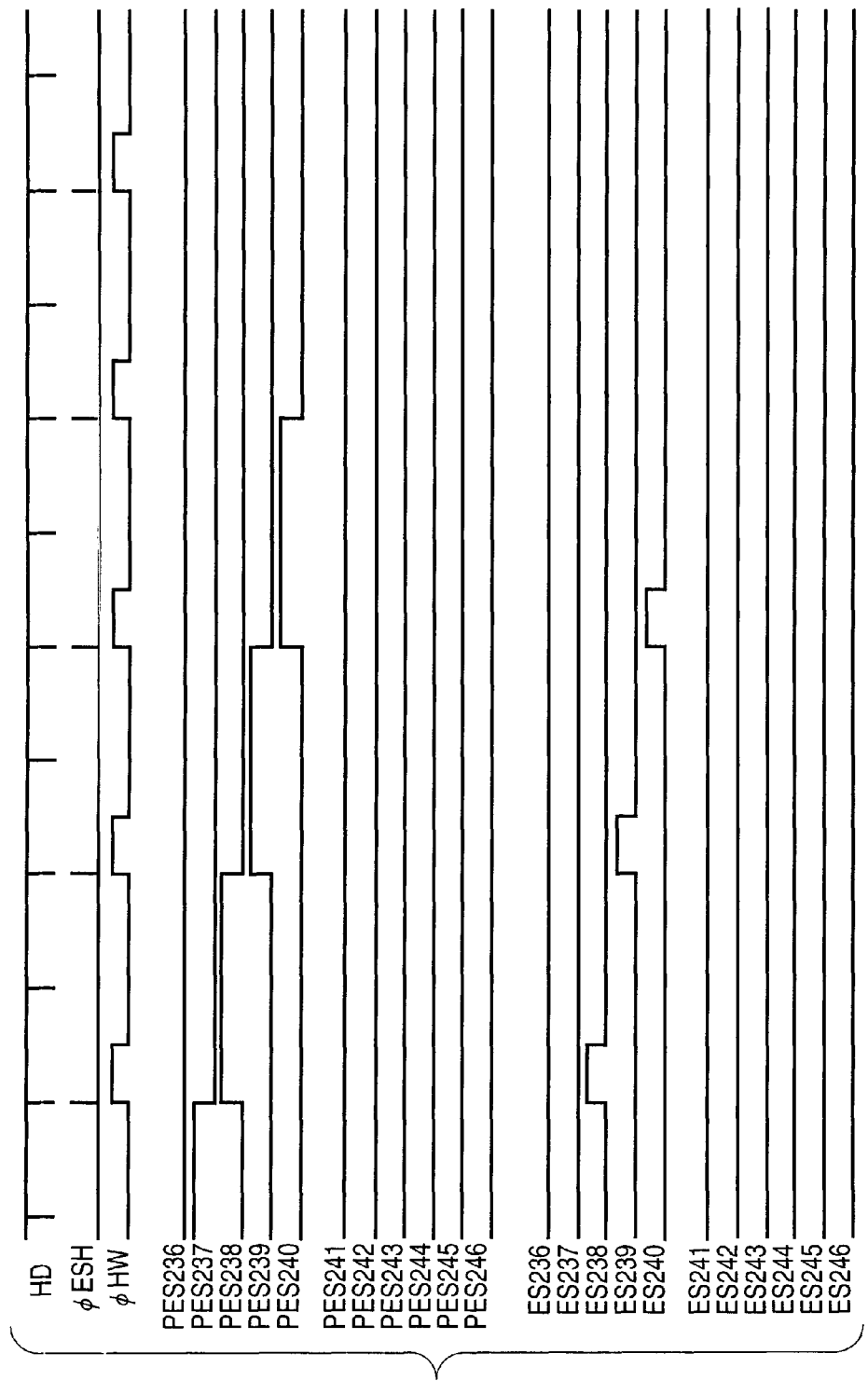
FIG. 22 is a timing chart showing various shutter control signals when various pulse signals having timing shown in FIG. 15 and FIG. 16 are generated using the vertical line reset circuit shown in FIG. 20.

FIG. 22 is a timing chart showing a shutter control signal ESj when blocks 19A and 19B generate a pulse signal φREAD having timing shown in FIG. 15 and FIG. 16 using the vertical line reset circuit 19 having the circuit configuration shown in FIG. 20. In this case, one block 19A of the vertical line reset circuit 19 is supplied with a two-horizontal (2H) period signal as a pulse signal φESH, and further, supplied with a pulse signal φHW one-time by one-time every 2H period. Moreover, a pulse signal φESIA input to the first-stage shift register circuit 41 is generated by the storage time control circuit 23 to have a 2H pulse width. Then, the pulse signal φESIA input to the first-stage shift register circuit 41 is synchronous with a pulse signal φESH, and thus, shifted successively by 240 shift register circuits 41 1H by 1H, and thereby, a pulse signal PESj is output. In this case, in order to generate a pulse signal ES for the first-half period of 1H period, the logic of the pulse signal PESj with a pulse signal φHW is taken by each AND gate circuit 42, in this way, a shutter control signal ESj having successively shifted timing is generated. As a result, the shutter control signal ESj successively shifts 2H by 2H in its timing.

In the other block 19B, the control is carried out so that the a pulse signal φESIB generated by the storage time control circuit 23 is always set to a level L (low). Therefore, as seen from FIG. 22, the output signal PESj (j=241 to 480) of each shift register circuit 41 of the block 19B is intactly a level L. In place of the signal, the pulse selector circuit 21 generates signals after the pulse signal φREAD241 using a timing signal VREAD.

Figure 23:
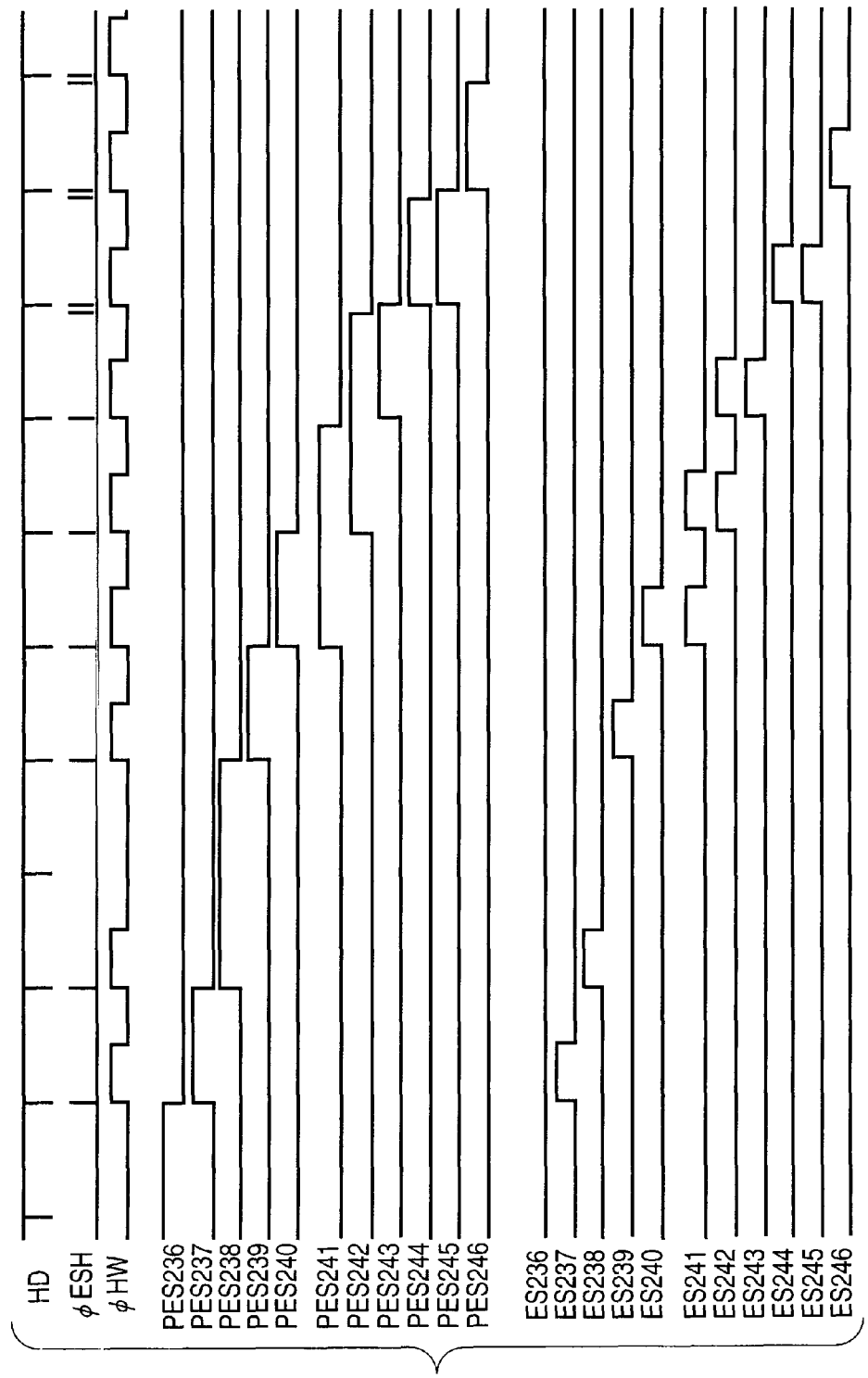
FIG. 23 is a timing cart showing various shutter control signals when various pulse signals having timing shown in FIG. 17 are generated using the vertical line reset circuit shown in FIG. 20.

FIG. 23 is a timing cart showing a shutter control signal ESj when blocks 19A and 19B generate a pulse signal φREAD having timing shown in FIG. 17 are generated using the vertical line reset circuit 19 having the circuit configuration shown in FIG. 20. In this case, one block 19A of the vertical line reset circuit 19 is supplied with a one-horizontal (1H) period signal as a pulse signal φESIA, and further, supplied with a 1H period signal as a pulse signal φESH. Moreover, a pulse signal φHW is input one-time by one-time every 1H period. In this case, a pulse signal φESH is thinned at a certain timing. Specifically, the storage time control circuit 23 control the period of a pulse signal φESH at random. In synchronous with the pulse signal φESH, a pulse signal φHW is thinned likewise. For example, a pulse signal φESH is thinned at a timing between shutter control signals ES238 and ES239. Therefore, the pulse width of the timing signal ES238 output from the shift register circuit 41 existing between two AND gates 42 outputting shutter control signals ES238 and ES239 is set to 2H. As a result, shutter control signals ES238 and ES239 have the interval 2H; therefore, the interval 2H is given between timing signals φREAD238 and φREAD239 output from the pulse selector circuit 21 based on the shutter control signals ES238 and ES239.

The other block 19B of the vertical line reset circuit 19 is supplied with a two-horizontal (2H) period signal as a pulse signal φESHB, and further, supplied with a 1H period signal as a pulse signal φESH. Moreover, a pulse signal φHW is input one by one every 1H period. In this case, a pulse signal φESH is input two-time by two-time after a certain one-horizontal period. For example, a pulse signal φESH is input two-time by two-time after the shutter control signal ES243. In this way, shutter control signals ES242 and ES243 are simultaneously output, and after that, shifted 1H, and thereafter, two shutter control signals are simultaneously output every two vertical lines. As a result, no interval exists between timing signals φREAD242 and φREAD243 output from the pulse selector circuit 21 based on the shutter control signals ES242 and ES243. Further, the interval of 1H is given between timing signals φREAD243, φREAD244 and φREAD245, and no interval exists between timing signals φREAD244 and φREAD245. In this case, shutter control signals ES241 and ES242 are simultaneously output for continuous two horizontal periods. However, an effective signal storage time is a signal output for the latter horizontal period of the two horizontal periods.

Namely, according to the operation, an operation circuit included in the storage time control circuit 23 outputs a transfer clock signal, that is, a pulse signal φESH after being thinned with respect to one horizontal period in one frame. Moreover, the operation circuit outputs a variable clock signal for performing a data transfer by a shift register circuit at a double speed, as the pulse signal φESH.

Figure 24:
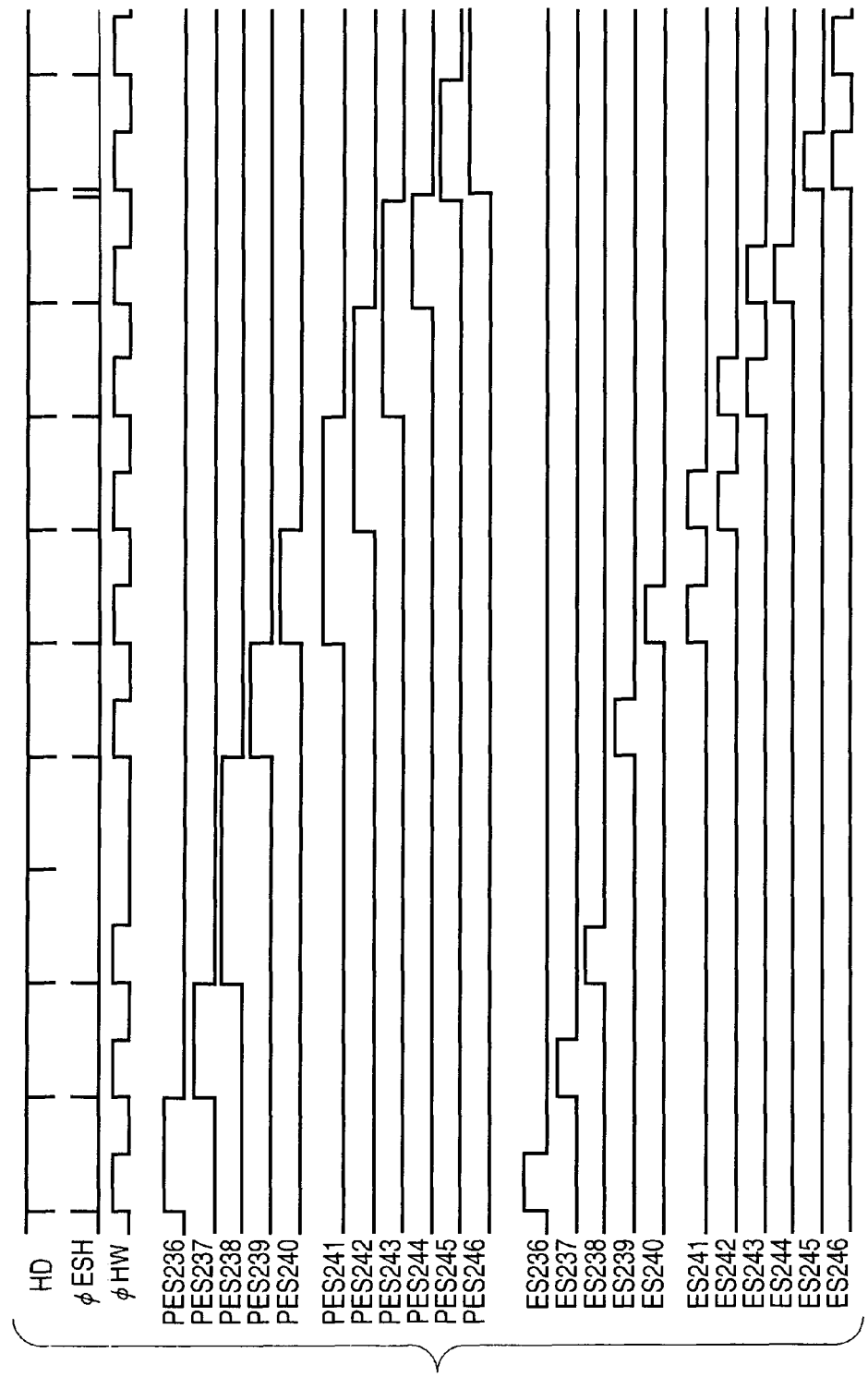
FIG. 24 is a timing cart showing various shutter control signals when various pulse signals having timing shown in FIG. 18 are generated using the vertical line reset circuit shown in FIG. 20.

FIG. 24 is a timing cart showing a shutter control signal ESj when blocks 19A and 19B generate a pulse signal φREAD having timing shown in FIG. 18 are generated using the vertical line reset circuit 19 having the circuit configuration shown in FIG. 20. In this case, one block 19A of the vertical line reset circuit 19 is supplied with a one-horizontal (1H) period signal as a pulse signal φESIA, and further, supplied with a 1H period signal as a pulse signal φESH. Moreover, a pulse signal φHW is input one-time by one-time every 1H period. In this case, a pulse signal φESH is thinned at a certain timing. In synchronous with the pulse signal φESH, a pulse signal φHW is thinned likewise. For example, a pulse signal φESH is thinned at a timing between shutter control signals ES238 and ES239. Therefore, the pulse width of the timing signal ES238 output from the shift register circuit 41 existing between two AND gates 42 outputting shutter control signals ES238 and ES239 is set to 2H. As a result, shutter control signals ES238 and ES239 have the interval 2H; therefore, the interval 2H is given between timing signals φREAD238 and φREAD239 output from the pulse selector circuit 21 based on the shutter control signals ES238 and ES239.

The other block 19B of the vertical line reset circuit 19 is supplied with a two-horizontal (2H) period signal as a pulse signal φESHB, and further, supplied with a 1H period signal as a pulse signal φESH. Moreover, a pulse signal φHW is input one by one every 1H period. In this case, a pulse signal φESH is input two-time by two-time after a certain one-horizontal period. For example, a pulse signal φESH is input two-time in the shutter control signal ES244. In this way, shutter control signals ES243 and ES244 are simultaneously output. As a result, no interval exists between timing signals φREAD243 and φREAD244 output from the pulse selector circuit 21 based on the shutter control signals ES243 and ES244. In this case, shutter control signals ES241, ES242, and ES243 are simultaneously output for continuous two horizontal periods. However, an effective signal storage time is a signal output for the latter horizontal period of the two horizontal periods.

Namely, according to the operation, an operation circuit included in the storage time control circuit 23 outputs a transfer clock signal, that is, a pulse signal φESH after being thinned with respect to one horizontal period in one frame. Moreover, the operation circuit outputs a variable clock signal for performing a data transfer by a shift register circuit at a double speed, as the pulse signal φESH.

FIG. 10 shows the case where the vertical line reset circuit 19 is divided into two blocks that is, 19A and 19B, and these blocks are supplied with different pulse signals φESIA and φESIB as a data input. In this case, the pulse width of the pulse signal φESIA generated by the storage time control circuit 23 is set to 2H or more. In this way, a signal shifted by one block 19A is supplied to the other block 19B as a pulse signal φESIB. In other words, it is possible to omit a generation of a pulse signal φESIB by the storage time control circuit 23.

Modification Example of Second Embodiment

Figure 25:
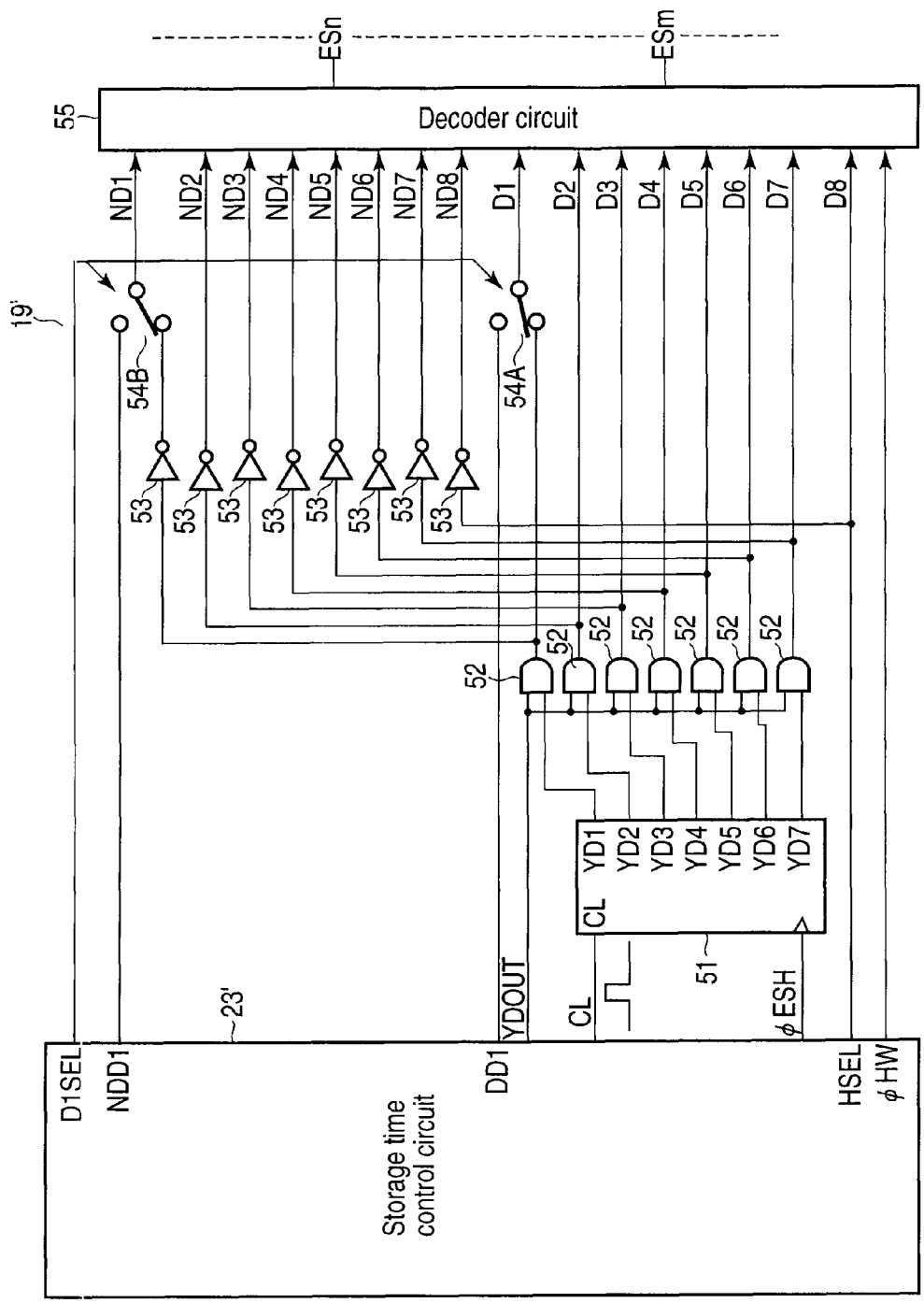
FIG. 25 is a circuit diagram showing the configuration of a part of a CMOS image sensor according to a modification example of the second embodiment.

According to the second embodiment, in the CMOS image sensor, the vertical line reset circuit 19 is configured using a shift register circuit. In this case, the vertical line reset circuit 19 may be configured using a decoder circuit. FIG. 25 is a circuit diagram showing the configuration of a part of a CMOS image sensor according to a modification example of the second embodiment. In particular, FIG. 25 shows each circuit configuration of a storage time control circuit 23' and a vertical line reset circuit 19' when a vertical line reset circuit is configured using a decoder circuit.

According to this modification example, a shutter control signal ES is generated based on count output signals YD1 to YD7 of a counter circuit 51 included in the vertical line reset circuit 19'. For example, the counter circuit 51 comprises a frequency divider circuit. The storage time control circuit 23' generates a pulse signal φESH as a clock signal supplied to the counter circuit 51. Further, the storage time control circuit 23' generates a clear signal CL for clearing a state of the counter circuit 51. Furthermore, the circuit 23' generates various control signals D1SEL, DD1, NDD1, YDOUT, HSEL and a pulse signal φHW, in addition to the forgoing signals.

The vertical line reset circuit 19' is provided with a plurality of AND gate circuits 52, a plurality of inverter circuits 53, two switch circuits 54A, 54B and a decoder circuit 55, in addition to the counter circuit 51.

The counter circuit 51 divides a pulse signal φESH to generate count output signals YD1 to YD7. These count output signals YD1 to YD7 are concurrently input to a plurality of AND gate circuits 52 together with a control signal YDOUT generated by the storage time control circuit 23'. Of the AND gate circuits 52, an output signal of the AND gate circuit 52 supplied with a count signal YD1 is switched by a switch circuit 54A together with a control signal DD1 generated by the storage time control circuit 23'. Thereafter, the switched output signal is output as a signal D1 to the decoder circuit. Output signals of other AND gate circuits 52 supplied with output signals YD2 to YD7 other than the count output signal YD1 are input as signals D2 to D7 to the decoder circuit 55. Moreover, a control signal HSEL generated by the storage time control circuit 23' is input as a signal D8 to the decoder circuit 55.

The output signals of AND gate circuits 52 are concurrently input to a plurality of inverter circuits 53. An output signal of an inverter circuit 53 supplied with the output signal of the AND gate circuit 52 receiving the count signal YD1 and the control signal TDOUT is switched by a switch circuit 54B together with a control signal DD1 generated by the storage time control circuit 23'. Thereafter, the switched output signal is input as a signal ND1 to the decoder circuit 55. Other output signals of inverter circuits 53 except the output signal are input as ND2 to ND7 to the decoder circuit 55. Moreover, a control signal HSEL generated by the storage time control circuit 23' is inverted by the inverter circuit 53, and thereafter, input as a signal ND8 to the decoder circuit 55. The switching control of the two switch circuits 54A and 54B is carried out based on a control signal D1SEL generated by the storage time control circuit 23'.

FIG. 26 is a circuit diagram showing the detailed configuration of the decoder circuit 55 shown in FIG. 25. The decoder circuit 55 comprises a plurality of AND gate circuits 61 and a plurality of AND gate circuits 62. Specifically, the AND gate circuits 61 take the logical product of eight signals having different combinations of signals D1 to D8 and signals ND1 to ND8 to generate a signal PESk (k=1 to 480). The AND gate circuits 62 take the logical product of the signal PESk with a pulse signal φHW to generate a signal ESk (k=1 to 480). For example, three AND gate circuits 61 for generating a signal PES1 are supplied with a signal D1 and signals ND2 to ND8.

In this case, the pulse signal φHW input to the AND gate circuits 62 is used for specifying the first half of a one-horizontal (1H) period.

Figure 27:
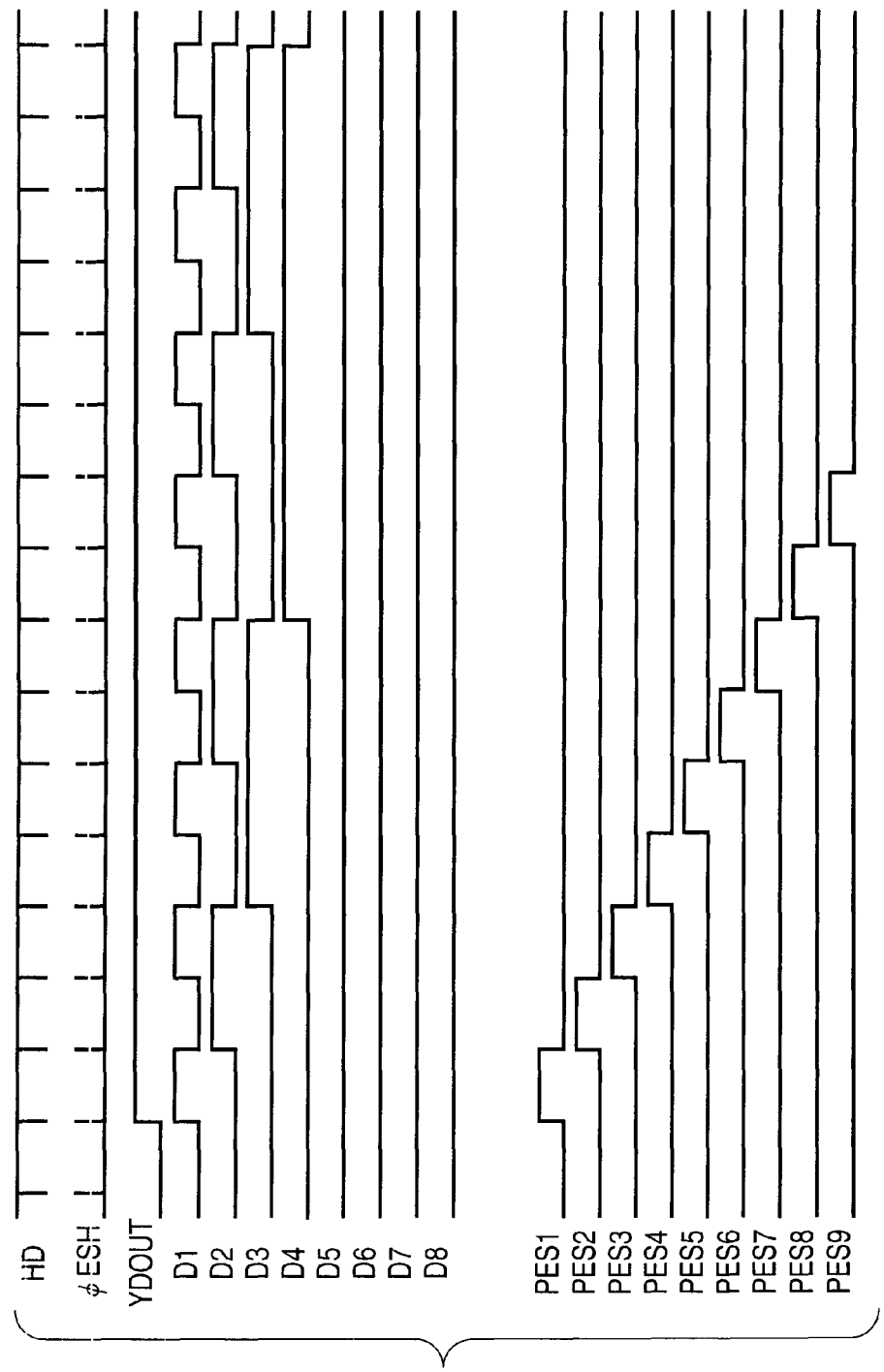
FIG. 27 is a timing chart showing one example of the operation of a vertical line reset circuit shown in FIG. 25.

FIG. 27 is a timing chart showing one example of the operation of the vertical line reset circuit 19' shown in FIG. 26. When the switch circuit 54A is switched to the output signal side of the AND gate circuit 52, signals D1 to D8 are synchronous with a pulse signal, and then, change as well as count signals YD1 to YD8 output from the counter circuit 51. The signal D1 has a period of two times as much as a pulse signal φESH, and the signal D2 has a period of two times as much as the signal D1. Hereinafter, likewise, the signal D7 has a period of two times as much as the signal D6. The signal D8 is used for specifying a plurality of vertical lines of the upper-half or lower-half area of an imaging area in the vertical line. The signal D8 is set to a level L when specifying a plurality of vertical lines of the upper-half area while being set to a level H when specifying a plurality of vertical lines of the lower-half area. Moreover, the control signal YDOUT is used for specifying a period of making valid an output of the counter circuit.

Figure 28:
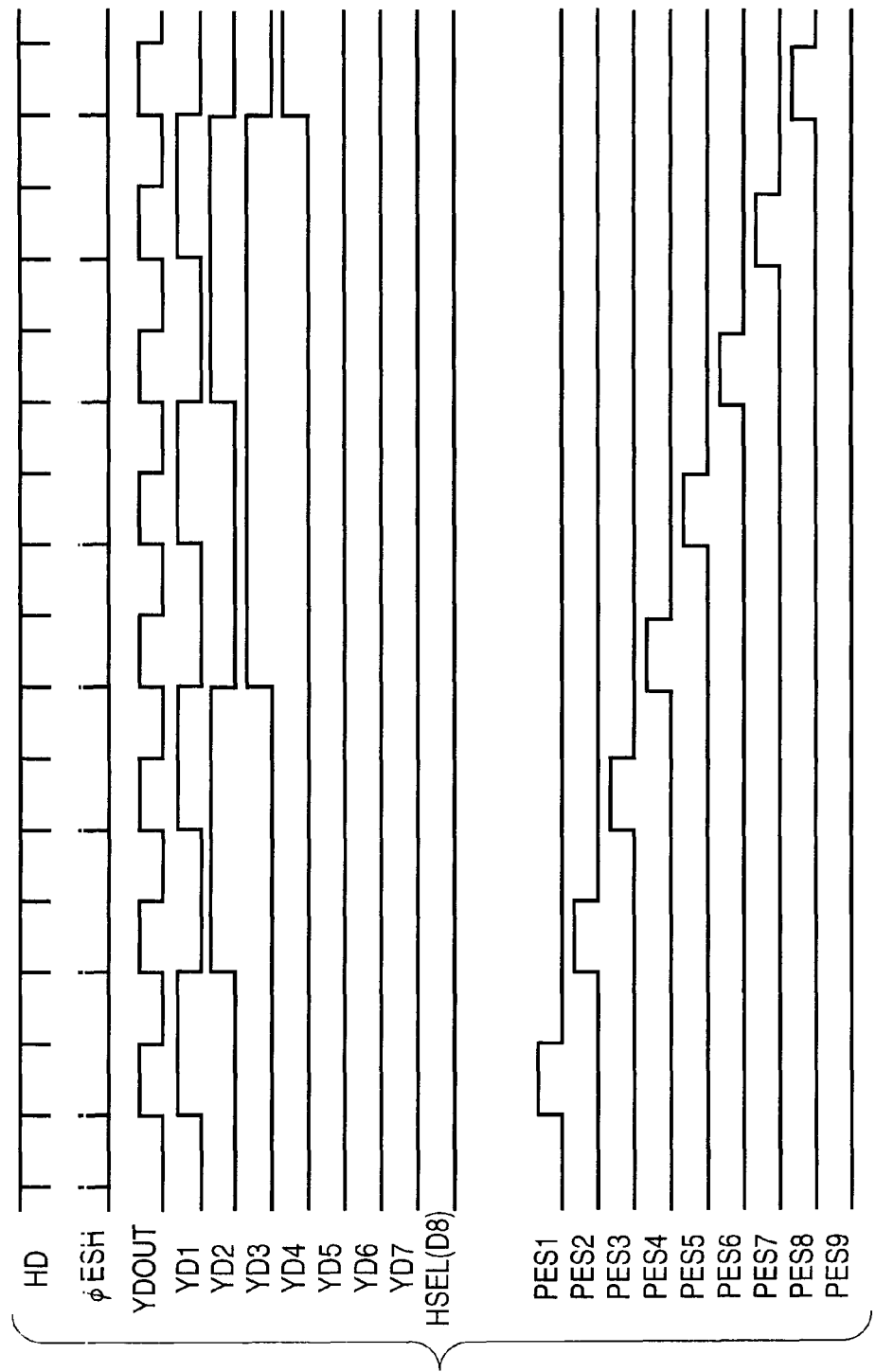
FIG. 28 is a timing chart when various pulse signals shown in FIG. 15 and FIG. 16 are generated at 2H (tow-horizontal) periods using a vertical line reset circuit shown in FIG. 25.

FIG. 28 is a timing chart when a pulse signal φREAD shown in FIG. 15 and FIG. 16 are generated at two-horizontal (2H) periods using the vertical line reset circuit 19 shown in FIG. 25. In this case, the storage time control circuit 23' generates a pulse signal φESH at a 2H period of a horizontal synchronizing signal HD. For a 1H period of the second half of the pulse signal φESH having a 2H period, the storage time control circuit 23' sets a control signal YDOUT to a level L. When the control signal YDOUT is a level L, signals D1 to D7 are set to a level L. Count signals YD1 to YD7 of the counter circuit 51 changes in synchronous with a pulse signal φESH. The signal YD1 has a period of two times as much as the signal YDOUT, and the signal YD2 has a period of two times as much as the signal YD1. Hereinafter, likewise, the signal YD7 has a period of two times as much as the signal YD6. Finally, signals ES1 to SE240 of output signals from the decoder circuit 55 of FIG. 26 each shift 2H by 2H.

Figure 29:
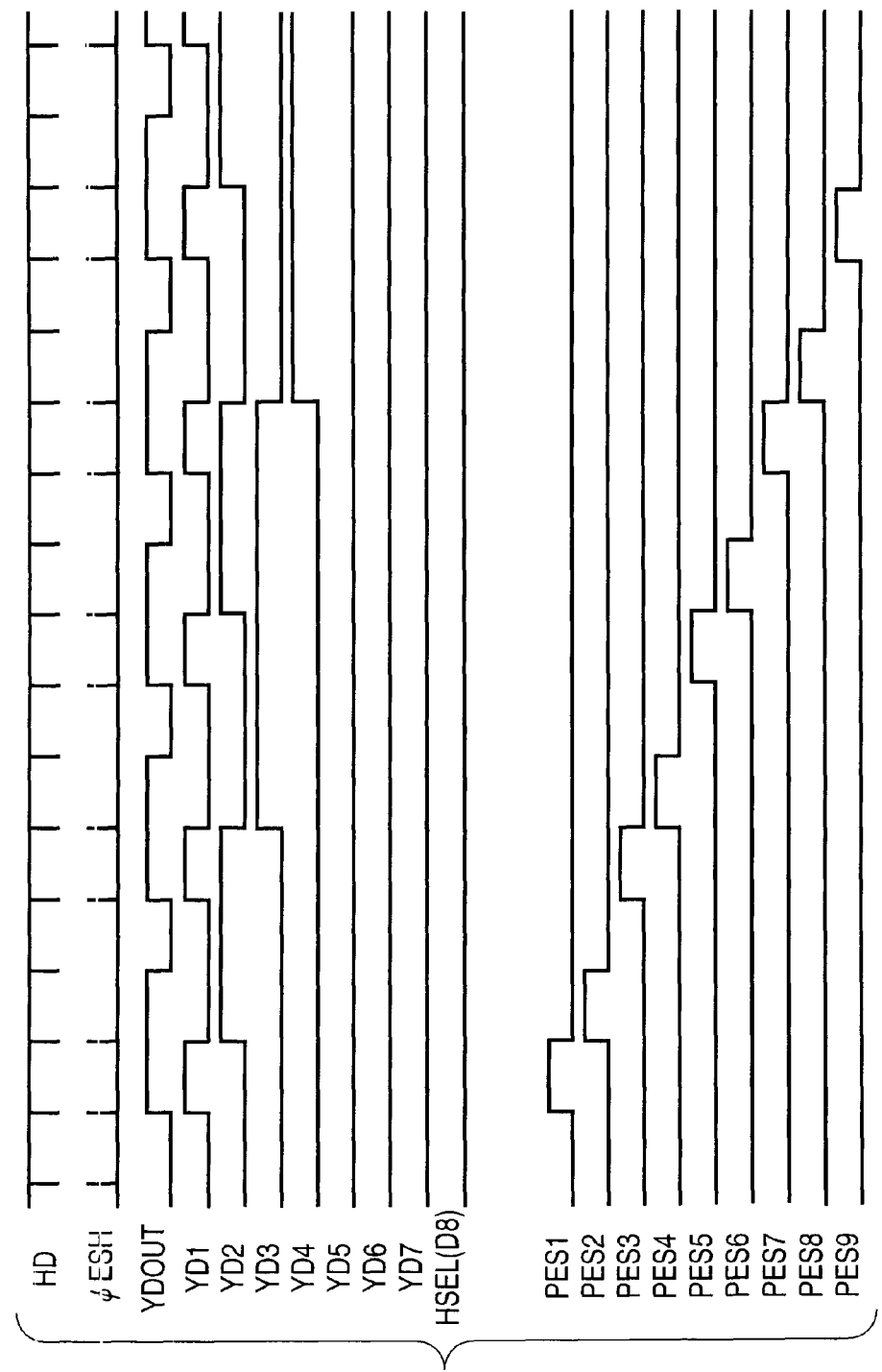
FIG. 29 is a timing chart when various pulse signals shown in FIG. 17 are repeatedly generated at 2H periods and 1H period using a vertical line reset circuit shown in FIG. 25.

FIG. 29 is a timing chart when a pulse signal φREAD shown in FIG. 17 are repeatedly generated at two-horizontal (2H) periods and one-horizontal (1H) period using the vertical line reset circuit 19' shown in FIG. 25. In this case, the storage time control circuit 23' generates a pulse signal φESH repeatedly at 2H and 1H of a horizontal synchronizing signal HD. For a 1H period of the second half of the pulse signal φESH having a 2H period, the storage time control circuit 23' sets a control signal YDOUT to a level L, and sets signals D1 to D7 to a level L. Count signals YD1 to YD7 of the counter circuit 51 changes in synchronous with a pulse signal φESH. Finally, signals ES1 to SE240 of output signals from the decoder circuit 55 of FIG. 26 each shift repeatedly at 1H and 2H.

Figure 30:
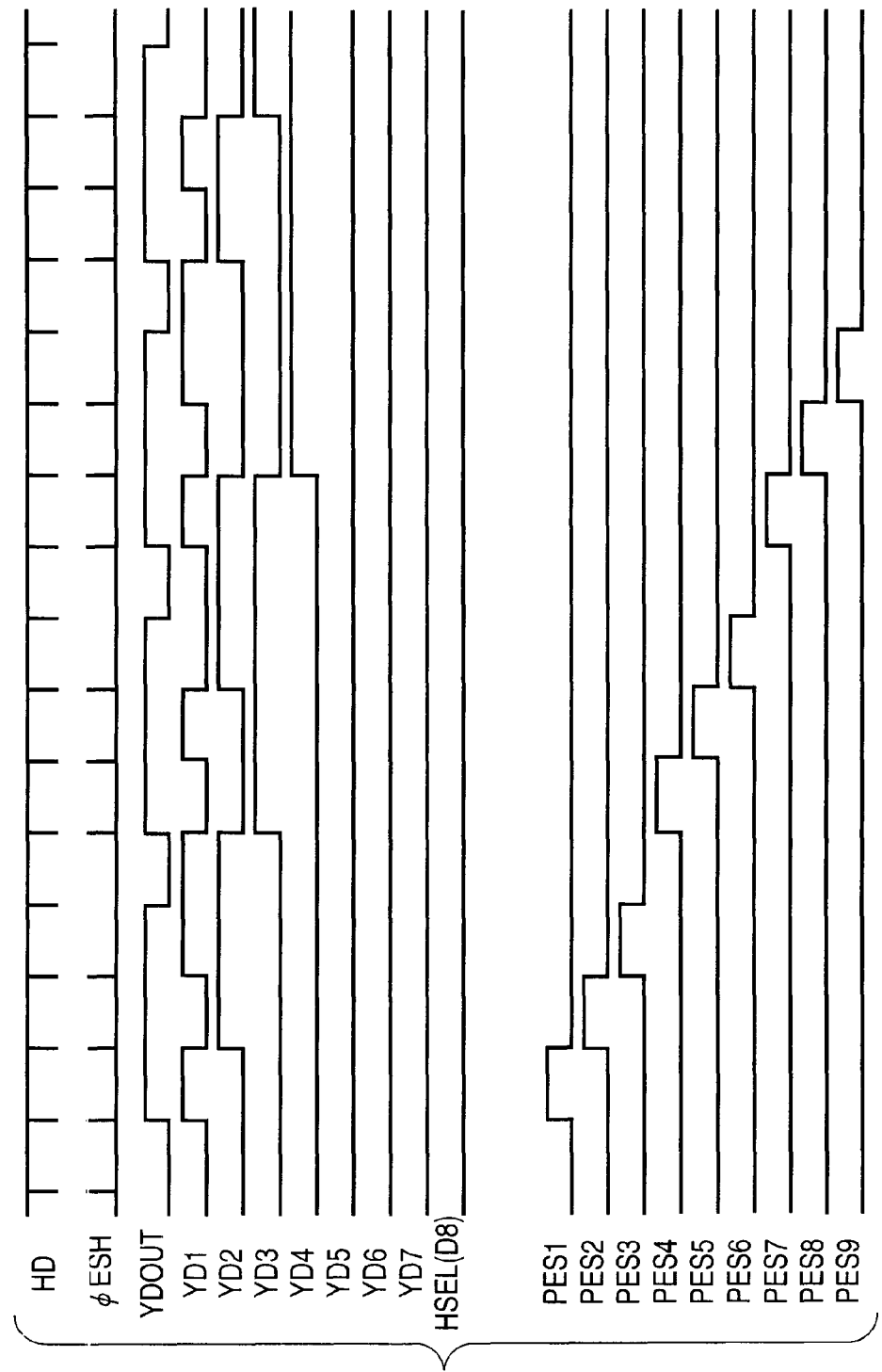
FIG. 30 is a timing chart when various pulse signals shown in FIG. 18 are repeatedly generated at that is, 1H period, 1H period and 2H period using a vertical line reset circuit shown in FIG. 25.

FIG. 30 is a timing chart when a pulse signal φREAD shown in FIG. 18 are repeatedly generated at one-horizontal period (1H), two-horizontal (2H) periods and one-horizontal (1H) period using the vertical line reset circuit 19' shown in FIG. 25. In this case, the storage time control circuit 23' generates a pulse signal φESH repeatedly at 2H, 1H and 1H of a horizontal synchronizing signal HD. For a 1H period of the second half of the pulse signal φESH having a 2H period, the storage time control circuit 23' sets a control signal YDOUT to a level L, and sets signals D1 to D7 to a level L. Count signals YD1 to YD7 of the counter circuit 51 changes in synchronous with a pulse signal φESH. Finally, signals ES1 to SE240 of output signals from the decoder circuit 55 of FIG. 26 each shift repeatedly at 1H, 1H and 2H.

Figure 31:
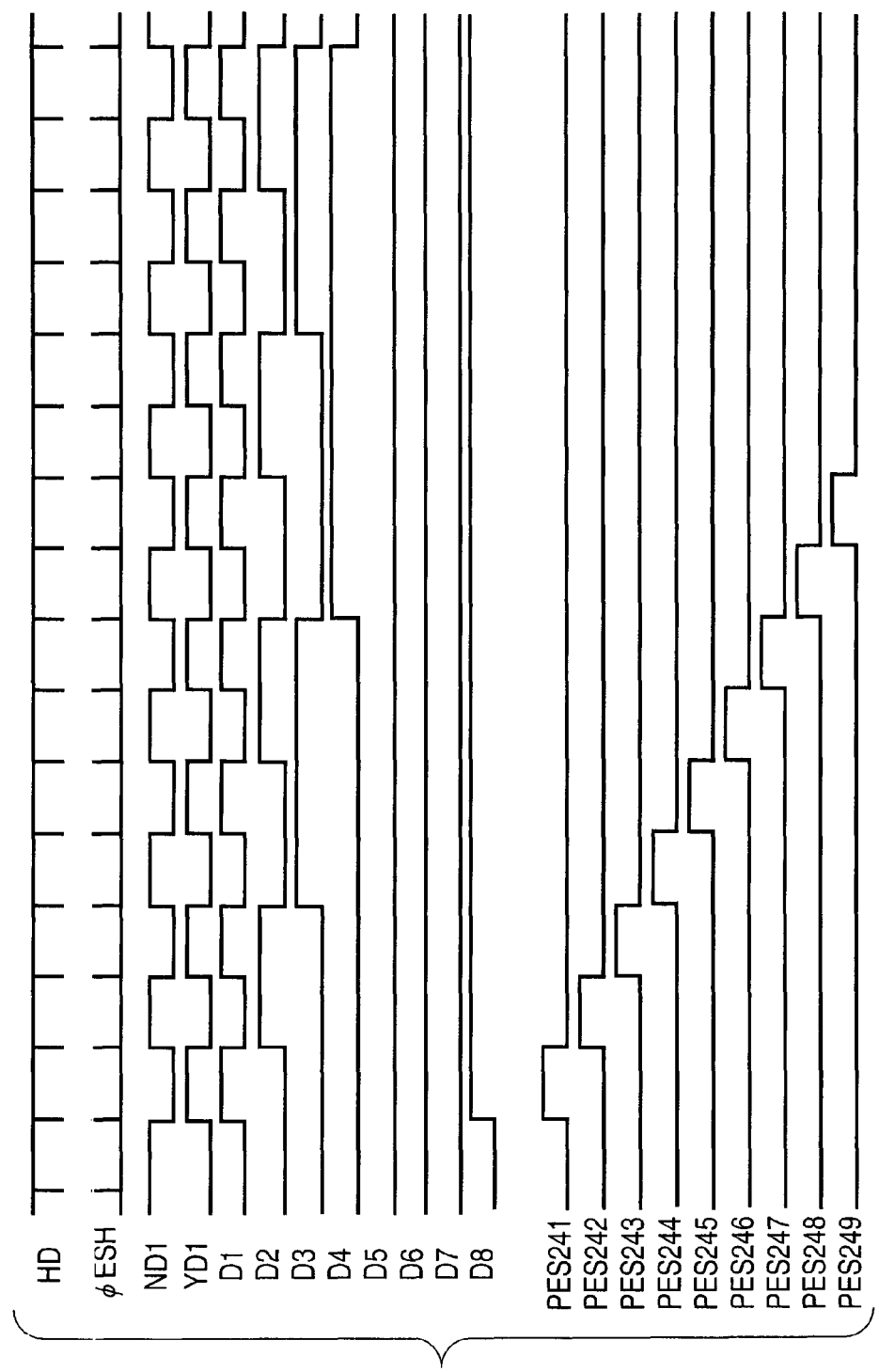
FIG. 31 is a timing chart sowing a standard operation when various pulse signals are generated using a vertical line reset circuit shown in FIG. 25.

FIG. 31 is a timing chart sowing a standard operation when pulse signals φEREAD241 to φEREAD 480 are generated using the vertical line reset circuit 19' shown in FIG. 25. The storage time control circuit 23' generates a clear signal CL to clear a count state of the counter circuit 51. Moreover, the storage time control circuit 23' generates a pulse signal φESH at a 1H period of a horizontal synchronizing signal HD.

When an all-pixel simultaneous reset operation shown in FIG. 15 and FIG. 16 is carried out, the storage time control circuit 23' sets a control signal HSEL (D8) to a level H. Moreover, the storage time control circuit 23' generates a clear signal CL to clear a count state of the counter circuit 51. Or, the circuit 23' sets a control signal YDOUT to a level L so that signals D1 to D7 are all set to a level L, in this way, sets all output signals of the decoder circuit 55. In place of the operation, the pulse selector circuit 21 generates pulse signals φREAD241 to φREAD480 using a timing signal VREAD.

Figure 32:
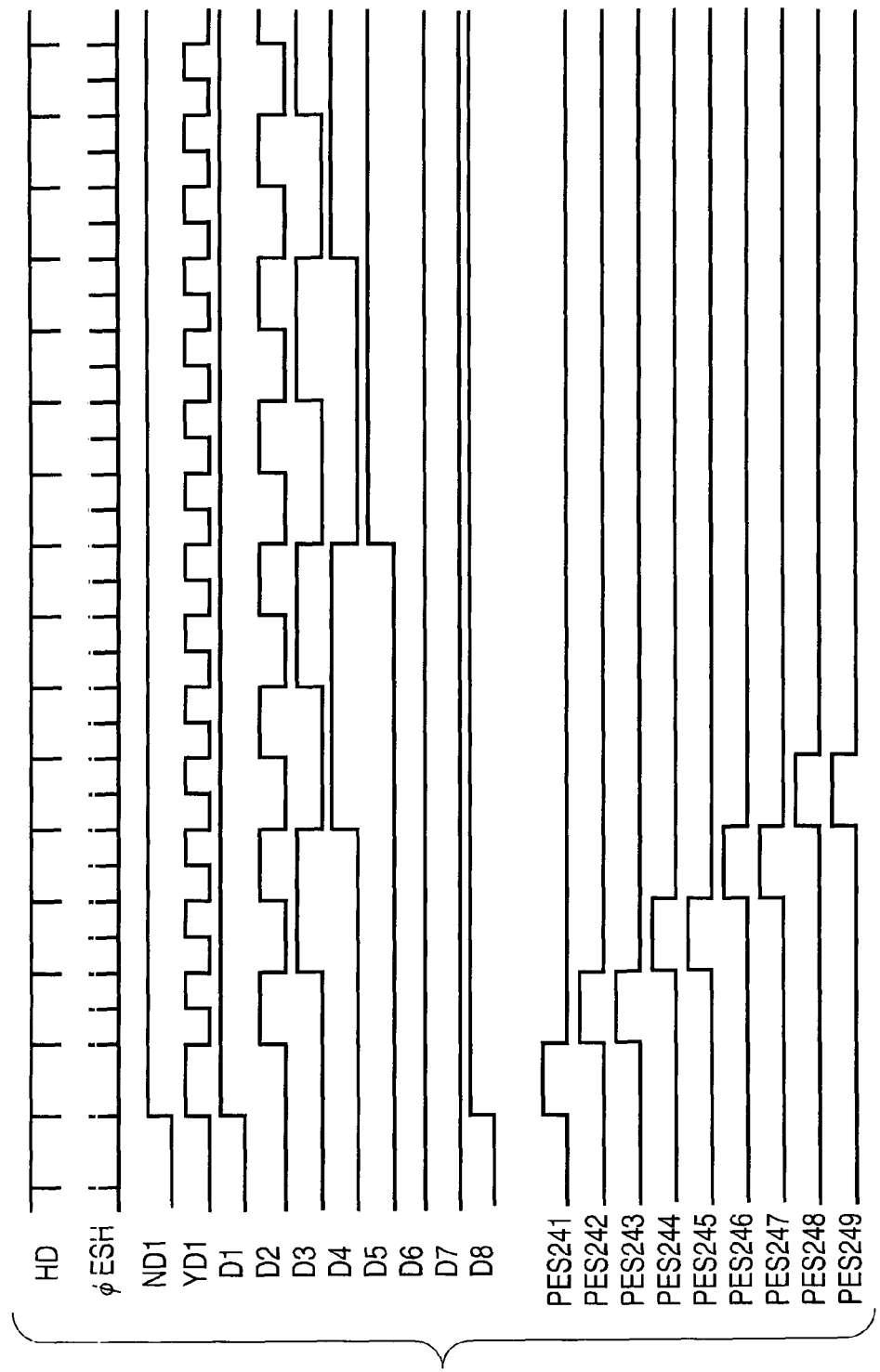
FIG. 32 is a timing chart when various pulse signals are generated to simultaneously select two vertical lines shown in FIG. 17 using a vertical line reset circuit shown in FIG. 25.

FIG. 32 is a timing chart when pulse signals φREAD241 to φREAD480 are generated to simultaneously select two vertical lines shown in FIG. 17 using the vertical line reset circuit 19' shown in FIG. 25. The storage time control circuit 23' generates a pulse signal φESH repeatedly at double speed from a timing of outputting a shutter control signal PES242. Moreover, the storage time control circuit 23' generates signals DD1 and NDD1 with level H. Then, the circuit 23' controls a control signal D1SEL so that the pulse signal is changed into these signals by switch circuits 54A and 54B. In this way, finally, output signals ES241 to ES480 of the decoder circuit 55 of FIG. 26, for example, signals ES242 and ES243 are simultaneously output.

Figure 33:
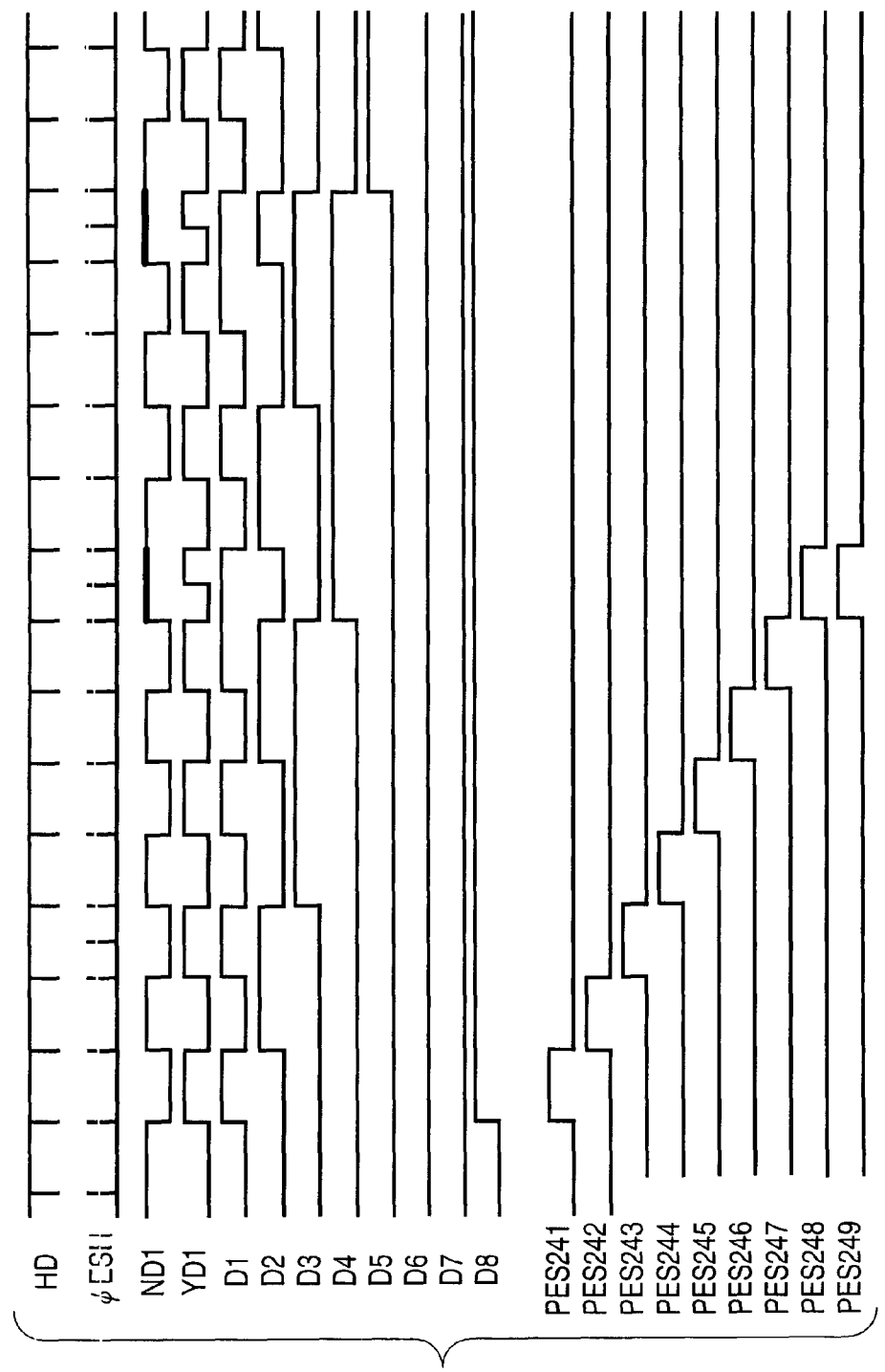
FIG. 33 is a timing chart when various pulse signals are generated to simultaneously select one vertical line, one vertical line and two vertical lines shown in FIG. 18 using a vertical line reset circuit shown in FIG. 25.

FIG. 33 is a timing chart when pulse signals φREAD241 to φREAD480 are generated to simultaneously select one vertical line, one vertical line and two vertical lines shown in FIG. 18 using the vertical line reset circuit 19' shown in FIG. 25. The storage time control circuit 23' generates a pulse signal φESH repeatedly at double speed, 1× speed and 1× speed from a timing of outputting a shutter control signal ES242. Moreover, the storage time control circuit 23' generates signals DD1 (D1) and NDD1 (ND1) having a waveform shown in FIG. 33. Then, the circuit 23' controls a control signal D1SEL so that the pulse signal is changed into these signals by switch circuits 54A and 54B. In this way, data is changed at portions shown by a bold line in the signal ND1, and finally, output signals ES241 to ES480 of the decoder circuit 55 of FIG. 26, for example, signals ES248 and ES249 are simultaneously output.

Figure 34A:
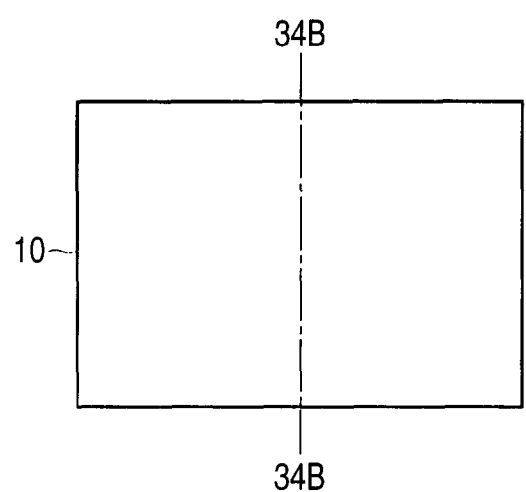
FIG. 34A is a block diagram showing an imaging area of CMOS image sensor according to various embodiments.
Figure 34B:
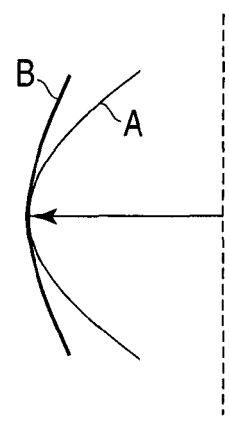
FIG. 34B is a view to explain a signal change in the vertical direction of the imaging area shown in FIG. 34A.

According to the various embodiments, in the CMOS image sensor, the signal storage time of vertical lines positioned on both ends of the imaging area in the vertical direction increases compared with the vertical line positioned on the center thereof. FIG. 34A is a block diagram showing an imaging area 10 of a CMOS image sensor, and FIG. 34B is a view to explain a signal change in the vertical direction of the imaging area shown in FIG. 34A. When a uniform light source is shot, the quantity of signals along the vertical direction of an imaging area becomes the maximum on the center thereof, and it is reduced toward upper and lower ends of the imaging area. According to a conventional lens, as seen from the characteristic curve A of FIG. 34B, the quantity of signals of about 40% is only obtained on upper end lower ends with respect to the center portion. However, according to the various embodiments, the signal storage time of unit pixels positioned on upper and lower ends is set twice as much as the unit pixel positioned on the center portion. Therefore, as seen from the characteristic curve B of FIG. 34B, the quantity of signals of about 80% is obtained at upper and lower ends with respect to the center portion. As a result, peripheral SNR by optical shot is improved about 3 dB compared with the conventional case.

The each embodiment relates to the case where each unit pixel is configured including four transistors and one photodiode. In this case, each unit pixel may be provided with two or four photodiodes. Moreover, each unit pixel is provided with a vertical select transistor (row select transistor); in this case, the vertical select transistor may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an imaging area provided with a plurality of unit pixels arrayed like a two-dimensional matrix, each unit pixel including: a photoelectric conversion element photoelectrically converting an incident light to store a signal charge; a read transistor reading the signal charge stored in the photoelectric conversion element to a detection part; an amplifier transistor amplifying and outputting a signal detected by the detection part; and a reset transistor resetting the detection part, the imaging area being divided in a vertical direction into a first region and a second region;
a vertical line drive circuit configured to select and drive the unit pixels at a unit of row, and to set a signal storage time of the photoelectric conversion element of each driven unit pixel; and
a control circuit connected to the vertical line drive circuit, and configured to execute a variable control of the signal storage time at a unit of row of the unit pixel,
wherein the control circuit is configured to control the vertical line drive circuit so that a signal storage time of a photoelectric conversion element of each unit pixel of a row positioned on the center portion of the imaging area in the vertical direction is set the shortest while being set long toward rows positioned on both ends of the imaging area in the vertical direction,
wherein the vertical line drive circuit includes a logic circuit, the logic circuit receives a signal synchronized with a horizontal synchronizing signal, a first timing signal for resetting, and a second timing signal for reading, outputs a reset signal to the reset transistor, and outputs a read signal to the read transistor, wherein the reset signal and the read signal are synchronized with the horizontal synchronizing signal,
wherein the vertical line drive circuit carries out the resetting of the second region after a completion of the resetting of the first region,
wherein the vertical line drive circuit is configured to control a plurality of vertical lines arrayed in the vertical direction in the first and second regions of the imaging area, respectively, such that the vertical line drive circuit sequentially carries out the resetting of the first region for every vertical line in the plurality of vertical lines in the first region, the vertical line drive circuit carries out the resetting of the second region so as to include first patterns, each of the first patterns is adjacent two or more simultaneously-selected vertical lines among the plurality of vertical lines in the second region, each vertical line connecting the vertical line drive circuit to the plurality of unit pixels.

2. The device according to claim 1, wherein the control circuit includes an operation circuit, which receives a storage time control data and outputs a shift data and a shift clock signal.

3. The device according to claim 2, wherein the vertical line drive circuit includes a plurality of shift register circuits receiving the shift data and the shift clock signal, and each shift register circuit is configured to start a shift operation of the shift data from rows of positions corresponding to one end and the center portion of the imaging area in the vertical direction, and to execute a shift operation so that the shift operation of the shift data ends at rows positioned on the other end and the center portion of the imaging area in the vertical direction, and further, to output shutter control signals.

4. The device according to claim 2, wherein the operation circuit is configured to output the shift clock, which is thinned with respect to one horizontal period in one frame.

5. The device according to claim 2, wherein the operation circuit is configured to control the period of the shift clock signal at random.

6. An electronic camera comprising:
an imaging area provided with a plurality of unit pixels arrayed like a two-dimensional matrix, each unit pixel including: a photoelectric conversion element photoelectrically converting an incident light to store a signal charge; a read transistor reading the signal charge stored in the photoelectric conversion element to a detection part; an amplifier transistor amplifying and outputting a signal detected by the detection part; and a reset transistor resetting the detection part, the imaging area being divided in a vertical direction into a first region and a second region;
a vertical line drive circuit configured to select and drive the unit pixels at a unit of row, and to set a signal storage time of the photoelectric conversion element of each driven unit pixel, wherein the vertical line drive circuit carries out the resetting of the second region after a completion of the resetting of the first region, the vertical line drive circuit is configured to control a plurality of vertical lines arrayed in the vertical direction in the first and second regions of the imaging area, respectively, such that the vertical line drive circuit carries out the resetting of the detection parts of the first region sequentially for every vertical line in the plurality of vertical lines in the first region, the vertical line drive circuit carries out a resetting of the detection parts of the second region so as to include first patterns, each of the first pattern is adjacent two or more simultaneously-selected vertical lines among the plurality of vertical lines in the second region, each vertical line connecting the vertical line drive circuit to the plurality of unit pixels;
a control circuit configured to be connected to the vertical line drive circuit, and to execute a variable control of the signal storage time at a unit of row of the unit pixel;
an optical lens configured to collect lights from a subject, and to irradiate the collected lights to the imaging area; and
a mechanical shutter configured to block lights irradiated to the imaging area.

7. The camera according to claim 6, wherein the control circuit includes an operation circuit, which receives a storage time control data and outputs a shift data and a shift clock signal.

8. The camera according to claim 7, wherein the vertical line drive circuit includes a plurality of shift register circuits receiving the shift data and the shift clock signal, and each shift register circuit is configured to start a shift operation of the shift data from rows of positions corresponding to one end and the center portion of the imaging area in the vertical direction, and to execute a shift operation so that the shift operation of the shift data ends at rows positioned on the other end and the center portion of the imaging area in the vertical direction, and further, to output shutter control signals.

9. The camera according to claim 7, wherein the operation circuit is configured to output the shift clock, which is thinned with respect to one horizontal period in one frame.

10. The camera according to claim 7, wherein the operation circuit is configured to control the period of the shift clock signal at random.

* * * * *